(12) United States Patent
Eibl et al.

(10) Patent No.: US 11,732,407 B2
(45) Date of Patent: Aug. 22, 2023

(54) WALLPAPER AND METHOD FOR PROVIDING WALLPAPER

(71) Applicant: BRAINSTOXX GmbH, Munich (DE)

(72) Inventors: Stefan Eibl, Munich (DE); Volker Zimmermann, Augsburg (DE)

(73) Assignee: BRAINSTOXX, GmbH, Munich (DE)

( * ) Notice: Subject to any disclaimer, the term of this patent is extended or adjusted under 35 U.S.C. 154(b) by 98 days.

(21) Appl. No.: 17/432,657

(22) PCT Filed: Feb. 20, 2020

(86) PCT No.: PCT/EP2020/054563
§ 371 (c)(1),
(2) Date: Aug. 20, 2021

(87) PCT Pub. No.: WO2020/169779
PCT Pub. Date: Aug. 27, 2020

(65) Prior Publication Data
US 2022/0042238 A1  Feb. 10, 2022

(30) Foreign Application Priority Data
Feb. 22, 2019  (DE) ............... 10 2019 104 600.9

(51) Int. Cl.
*D06N 7/00* (2006.01)
*B32B 3/26* (2006.01)
*B32B 5/02* (2006.01)

(52) U.S. Cl.
CPC .......... *D06N 7/0002* (2013.01); *B32B 3/266* (2013.01); *B32B 5/022* (2013.01); *B32B 5/024* (2013.01);
(Continued)

(58) Field of Classification Search
CPC ......... D06N 7/0002; D06N 2209/1664; D06N 2211/063; B32B 3/266; B32B 5/022;
(Continued)

(56) References Cited

U.S. PATENT DOCUMENTS

| 5,292,576 A | 3/1994 | Sanders |
| 2007/0012413 A1 | 1/2007 | Braun et al. |

(Continued)

FOREIGN PATENT DOCUMENTS

| CA | 3130025 A1 | 8/2020 |
| DE | 3129003 A1 | 4/1982 |

(Continued)

OTHER PUBLICATIONS

Vroman, Isabelle, et al, Biodegradable Polymers, Apr. 1, 2009, published by mdpi.com—doi: 10.3390/ma2020307, vol. 2(2), pp. 307-344, obtained from https://www.ncbi.nlm.nih.gov/pmc/articles/PMC5445709/ (Year: 2009).*

(Continued)

*Primary Examiner* — Brian Handville
(74) *Attorney, Agent, or Firm* — Christopher A. Rothe; Culhane Meadows PLLC

(57) ABSTRACT

A reusable wallpaper and method for producing reusable wallpaper for removable attachment to a wall or ceiling surface with wallpaper paste. The wallpaper includes only a flat base layer without a paste coating applied by the manufacturer. The flat base layer is in the form of a textile, in particular synthetic fibers.

20 Claims, 14 Drawing Sheets

(52) U.S. Cl.
CPC .......... *B32B 2262/0246* (2013.01); *B32B 2262/0253* (2013.01); *B32B 2262/0261* (2013.01); *B32B 2262/0276* (2013.01); *B32B 2607/02* (2013.01); *D06N 2209/1664* (2013.01); *D06N 2211/063* (2013.01)

(58) Field of Classification Search
CPC .......... B32B 5/024; B32B 2262/0246; B32B 2262/0253; B32B 2262/0261; B32B 2262/0276; B32B 2607/02
See application file for complete search history.

(56) References Cited

U.S. PATENT DOCUMENTS

| | | | |
|---|---|---|---|
| 2007/0172631 A1* | 7/2007 | Hugenholtz | B31D 5/0004 428/116 |
| 2018/0010291 A1 | 1/2018 | Zettl et al. | |
| 2020/0190365 A1* | 6/2020 | Krull | B32B 7/12 |

FOREIGN PATENT DOCUMENTS

| | | | |
|---|---|---|---|
| DE | 4300314 | A1 | 7/1994 |
| DE | 19535407 | A1 | 3/1997 |
| DE | 69403390 | T2 | 10/1997 |
| DE | 19810508 | A1 | 9/1999 |
| DE | 10034544 | A1 | 1/2002 |
| DE | 10157485 | A1 | 6/2002 |
| DE | 10201867 | A1 | 10/2003 |
| DE | 10252739 | A1 | 10/2004 |
| DE | 10358455 | A1 | 6/2005 |
| DE | 202006019663 | U1 | 3/2007 |
| DE | 202007009254 | U1 | 11/2008 |
| DE | 202014101364 | U1 | 3/2014 |
| DE | 102015200453 | A1 | 7/2016 |
| DE | 202017004365 | U1 | 9/2017 |
| EP | 2432828 | B1 | 12/2019 |
| GB | 1231990 | A | 5/1971 |
| GB | 2079630 | A | 1/1982 |
| WO | 0248276 | A1 | 6/2002 |
| WO | 2004106450 | A1 | 12/2004 |
| WO | 2010139548 | A1 | 12/2010 |
| WO | 2020169779 | A1 | 8/2020 |

OTHER PUBLICATIONS

Cleaver, Graham, Biodegradable Polymers: Analysis of Biodegradable Polymers by GPC/SEC, Aug. 1, 2015, Agilent Technologies, pp. 1-20, obtained from https://www.agilent.com/cs/library/applications/US5990-6920EN.pdf (Year: 2015).*

Search Report received in German Application No. 10 2019 104 600 9 dated Nov. 11, 2019, with translation, 12 pages.

Search Report received in International Application No. PCT/EP2020/054563 dated May 19, 2020, with translation, 5 pages.

Hiller, "Starching Fabric to Walls Creates Fantastic Looks," mattandshari.com, http://mattandshari.com/decorating/decorating-ideas/starching-fabric-towalls-creates-fantastic-looks/, Dec. 29, 2009, 3 pages.

McFarland, "Why Wallpaper When You Can Use Fabric?," Threads Magazine, https://www.threadsmagazine.com/2010/04/15/why-wallpaper-when-youcan-use-fabric,Apr. 15, 2010, 2 pages.

Office Action received in Canadian Application No. 3,130,025 dated Sep. 28, 2021, 6 pages.

Stephanie, "How to wallpaper with fabric using starch," Cre8tivedesignsinc.com, http://www.cre8tivedesignsinc.com/2013/04/how-to-wallpaper-with-fabricusing-starch/, Apr. 13, 2013, 11 pages.

Written Opinion received in International Application No. PCT/EP2020/054563 dated May 19, 2020, with translation, 13 pages.

* cited by examiner

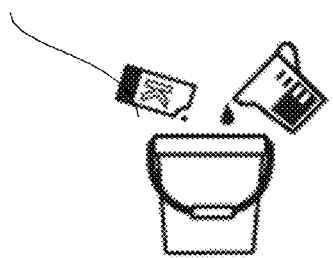
Fig. 4A
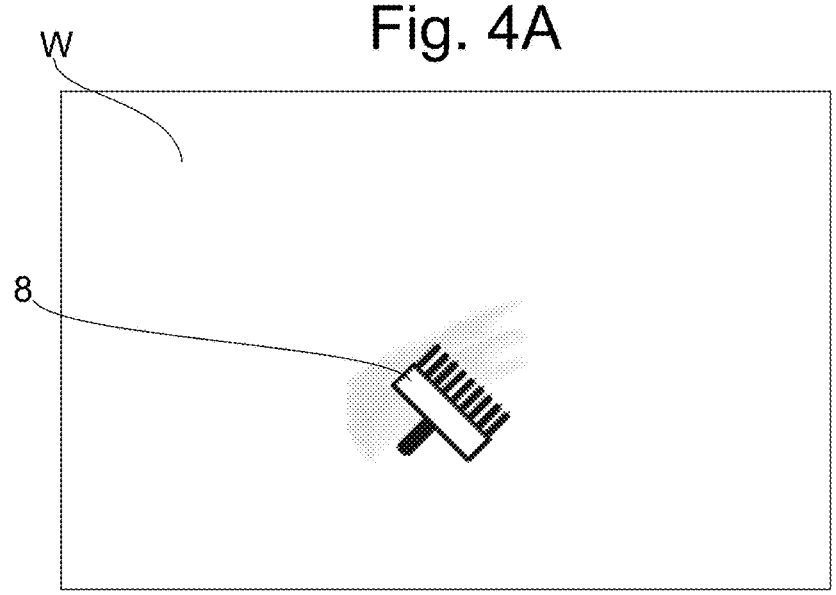
Fig. 4B
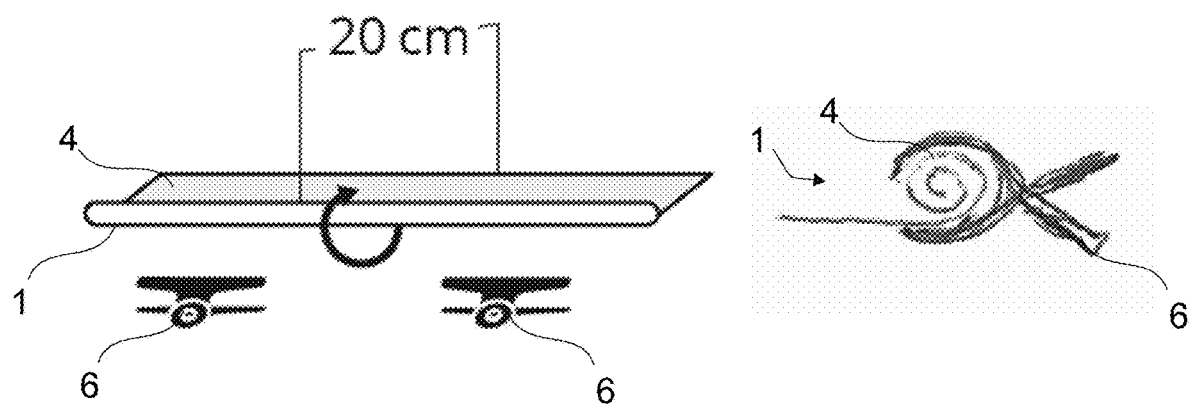
Fig. 4C
Fig. 4D

WALLPAPER AND METHOD FOR PROVIDING WALLPAPER

CROSS-REFERENCE TO RELATED APPLICATIONS

This application is the United States national phase entry of International Application No. PCT/EP2020/054563, filed Feb. 20, 2020, and claims the benefit of priority of German Application No. 10 2019 104 600.9, filed Feb. 22, 2019. The contents of International Application No. PCT/EP2020/054563 and German Application No. 10 2019 104 600.9 are incorporated by reference herein in their entireties.

FIELD

The present invention relates to a wallpaper, in particular a large wallpaper, as well as to a method for providing wallpaper. Further aspects of the invention relate to a mounting set for wallpaper and to a mounting method for wallpaper.

BACKGROUND

Web-shaped wallpapers or wall linings of most diverse materials have been known for a long time. Those wallpapers for wall decoration generally have the drawback that the gluing of webs required for this purpose is time-consuming and requires mechanical skills. In addition, residue-free removal of wallpapers frequently is a laborious undertaking, as many wallpaper materials tear during removal and adhere in pieces on the previously lined surface.

For this reason, in the state of the art frequently attempts were made to be able to remove wallpapers as completely as possible from the wall. From DE 198 10 508 and from DE 195 35 407 A1, for example, removable wall linings fastened to the wall by means of Velcro strips are known. A method for removing wallpapers by wetting is described in publication DE 43 00 314. Moreover, removable wall papers are known which are specifically coated on the wall-side surface and, resp., their rear side so as to be easily strippable in combination with adapted glues (DE 31 29 003). Publication DE 100 34 544 A1 discloses the use of specific glues and/or a wall-side surface coating having a specific structure for providing re-strippable web-shaped wallpaper.

Publication DE 694 03 390 T2 discloses a wallpaper comprising a surface material or external material made from synthetic film, e.g., vinyl, or paper material, and comprising a base material of a base fabric made from polyester with an inserted weft of cotton. The surface material and the base material are glued to each other by an appropriate glue for forming a multi-layer wallpaper. Further, publication DE 20 2007 009 254 U1 discloses a multi-layer wall or floor lining of a web-like material with at least two non-woven polyester fiber fabrics glued to each other and an interposed electrically conducting braided mesh for shielding from electromagnetic fields and waves.

Publication DE 10 2015 2004 53 A1 discloses a wallpaper with a flat textile substrate which, on a surface, has a coating containing a glue that can be repeatedly activated with water.

Publication EP1631638B1 discloses a wallpaper as a paper-containing wall cover having an adhesive layer that is not tacky when dry, but can be activated using water on its rear face (facing the wall). From this publication, plural technical drawbacks of a wallpaper having an adhesive layer or glue pre-coating applied by the manufacturer on the wallpaper rear face can further be taken: For example, the glue coating should have as little impact on the usual production rate of the continuous wallpaper manufacture as possible, just like on the roll lay-up. Moreover, the adhesive layer should be anti-abrasive and should resist the normal wallpaper transportation without being damaged. Low blocking tendency in the rolled state is equally important: The adhesive layer should by no means become tacky when dry during storage. In so far, in the case of glue soluble in the aqueous state in the adhesive layer, a further drawback resulting is that exposition to ambient moisture must absolutely be avoided during storage.

All of those approaches taken so far result in a comparatively complex, and insofar multi-layered, wallpaper structure and, resp., in a comparatively complex method for providing and hanging a wallpaper or in comparatively complex methods for removing the wallpaper.

It would further be desirable when the removed wallpaper could be reused and could be attached to the same or a different position again.

SUMMARY

Against the afore-described background, it is the object of the present invention to provide easy-to-manufacture wallpaper that is not only easily removable or strippable from a wall but is also reusable, washable and re-hangable to a wall.

The subject matter of the invention is a wallpaper having at least one, preferably exclusively one base or carrier layer that is in the form of a textile fabric, in particular made from synthetic fiber, preferably without a glue coating applied by the manufacturer. One of the surfaces of the base layer forms a wall-side surface of the wallpaper by which the wallpaper is hung or hangable to a glued wall or ceiling surface. In other words, according to the invention, a textile, in particular from synthetic material, may form the carrier material and, resp., base material for a wallpaper. The wallpaper is intended to be glued or fixed, on an uncoated side, with the surface of the base material directly to a wall or ceiling surface.

Applicant surprisingly found that, by using a textile, in particular from synthetic fiber or synthetic yarn, as a single base material for a wallpaper, the wallpaper adheres properly to a wall or ceiling surface without a specific treatment or coating of the wall-side surface or surface area by means of (commercially available) wallpaper glue and nevertheless can be easily removed.

Accordingly, the structure of the textile is important which, in contrast to paper, woodchip or comparable wallpapers, is permeable to air and is provided with small gaps, thus reducing the surface area effectively adhering to a wall on the wall-side surface. By using a textile, the wallpaper moreover can be washed after removal, for example in a commercial washing machine, at 30° C. to 40° C. in particular using fine detergent, and can be attached to a wall again, if required. Hence, the wallpaper according to the invention cannot only be stripped in a residue-free manner, but can also be washed and repeatedly reused. In contrast to a common paper wallpaper, the wallpaper according to the invention has substantially higher tear strength so that it can be stripped off the wall in one piece.

Within the scope of the present invention, a glue from the adhesive group of the dispersion adhesives is to be understood by the term wallpaper glue. In dispersion adhesives, water (mostly) and/or a, preferably hydrophilic, solvent serve as a liquid phase in which at least one adhesive polymer, preferably at least two adhesive polymers as different adhesive components, are provided dispersed as solid phase or as dispersed solid particles. A dispersion is generally understood to be a finest distribution of a solid substance or solid phase in a liquid phase. That is to say, a multi-phase system (or solid-liquid two-phase system) is concerned, wherein the dispersing agent is provided as external continuous (coherent) liquid phase and the disperse phase is provided as internal spread (incoherent) solid phase or as disperse solid particles. Based on the size of the disperse solid particles from the at least one adhesive polymer [particle size 500 nm (finely dispersed) and/or 500-2000 nm (medium-dispersed) and/or more than 2000 nm (roughly dispersed)] and/or by means of at least one additive (stabilizer, emulsifier, etc.), they do not separate (do not sediment). Preferred solid contents range from 40 to 70 vol %.

Setting of the wallpaper glue as dispersion adhesive is initiated by removing the liquid phase, preferably the water, after applying the wallpaper glue to the base layer and, resp., to the textile fabric of the wallpaper. When using the dispersion adhesive or wallpaper glue, in the present case it is substantial that the liquid phase must be allowed to escape through the base layer or the textile fabric. In other words, the base layer or the textile fabric is configured to be permeable to the liquid phase, in particular to water and, resp., moisture, of the wallpaper glue.

In a glue gap forming between the (possibly glued, on the one hand) wall-side surface of the wallpaper and the (possibly glued, on the other hand, i.e., alternatively or cumulatively) wall or ceiling surface, the adhesive polymers are retained when the liquid phase escapes through the base layer and, resp., the textile fabric. The adhesive polymers form or melt into an adhesive layer on the wall-side surface of the wallpaper (film formation). The formed adhesive layer in the dried or set state causes the wallpaper according to the invention to reliably adhere to the wall or ceiling surface (until the time of desired stripping or removal of the wallpaper). In the present case, the connection of the adhesive layer formed on the base layer or the textile fabric and present in the dried and, resp., set state to the base layer or the textile fabric is so strong that the wallpaper can be removably, in particular removably largely residue-free, attached to the wall and ceiling surface in accordance with the invention. (Dry) removal or stripping of the wallpaper from the wall or ceiling surface can be carried out by exerting, for example, (manual) tensile force and/or shear force starting from one corner and/or side and/or edge of the wallpaper.

Due to its strong internal structure, the base layer or the textile fabric in particular offers the advantage of being integrally and/or residue-free removable from the wall or ceiling surface. On the other hand, a conventional paper wallpaper formed of a plurality of short fibers of plant origin by dehydration of a fiber suspension on a sieve in the form of a compressed non-woven structure turns out to be not (non-destructively) removable.

Preferably, a wallpaper glue based on cellulose and starch with portions of synthetic resin can be used.

Particularly, in the present case the term of the wallpaper glue relates to a particle-shaped binding agent composition, containing at least one natural or synthetic polysaccharide and at least one synthetic water-dispersible polymer. Polyvinyl acetate, acrylates, rubbers, polyurethanes and polychloroprene are important bases for dispersion adhesives. Those particle-shaped binding agent compositions are disclosed, for example, in WO 02/48276 A1 and DE 101 57 485 A1. Accordingly, the disclosure thereof is explicitly included into the present disclosure by reference in order to avoid repetitions.

A significant advantage of a currently preferred wallpaper glue provided as dispersion adhesive on the basis of water as external liquid phase, in addition to the aspect of availability at low cost, can be seen in the fact that it is composed largely free from emissions and, resp., sets in a toxically safe manner by drying.

According to a preferred embodiment of the invention, a pattern of small or smallest holes can be incorporated in the textile base layer. In this way, the effectively adhering surface in the adhesion compound can be reduced, which results in proper strippability of the wallpaper even in the dry state. In an advantageous manner, the holes may have a surface area from 0.2 to 2 $mm^2$, preferably 0.3 to 0.8 $mm^2$. Of preference, the hole pattern may be a uniform or homogenous pattern to provide good printability.

Another advantage of said afore-described perforated structure or a pore structure of the base layer or of the textile fabric resides in the fact that the wallpaper glue can be applied also from the front side of the wallpaper remote from the wall, such as painted and/or applied by an applicator roller. Hence, preferably the freshly applied wallpaper glue can wet into a perforated structure or a pore structure of the base layer and, resp., of the textile fabric. Then the still liquid wallpaper glue can spread onto the wall or ceiling surface disposed beyond the base layer. In so doing, a glue gap is configured between the wall-side (upper) surface of the base layer and the wall or ceiling surface.

Further, as regards the perforated structure or the pore structure of the base layer and, resp., of the textile fabric, it is regarded as advantageous that the former additionally promotes uniform drying of an aqueous portion and/or solvent of the wallpaper glue, preferably dispersion adhesive, from the wall or ceiling surface into the ambient air.

Concerning said technical mode of action, it is further known that the drying operation is performed according to a first drying stage, then a second drying stage and finally a third drying stage. The first drying stage occurs at the beginning of drying. When or as long as the front side of the wallpaper remote from the wall is wet by the aqueous portion and/or solvent of the wallpaper glue, the drying behavior substantially corresponds to that of a (pure) liquid surface. In the perforated structure or the pore structure, especially a capillary liquid passage takes place that has a beneficial effect on the drying speed. The drying behavior can be modelled on the basis of the known surface-physical principles and, resp., equations of Young (wetting angle), Washburn-Rideal (kinetics), Laplace (capillary pressure) et al. In the subsequent second drying stage, an (already) dry zone forms starting or extending from the front side of the wallpaper remote from the wall. In other words, the model conception of a drying level migrating in the direction to the wall or ceiling surface can make reference thereto. Since, accordingly, in already dried regions the diffusion coefficient for the vapor transport is very low, the drying rate decreases over time. Before the transition to the last or third drying stage, the last drop of the aqueous portion and/or solvent of the wallpaper glue being, on the one hand, in the perforated structure or the pore structure of the base layer and, resp., of the textile fabric, is vaporized. In other words, the end of the second drying stage corresponds, in a first approximation, to a dried and, resp., set state of the wallpaper glue. After that, the total system comprising the wallpaper with the wallpaper glue adopts the sorptive equilibrium moisture content relative to the ambient air in a slow, because diffusion-controlled, process.

In this context, yet another advantage of the afore-described preferred embodiment with the perforated structure or the pore structure of the base layer and, resp., of the textile fabric resides in the fact that said structure allows a surplus of (still liquid) wallpaper glue to be discharged toward the front side of the wallpaper remote from the wall. Hence, such surplus can be stripped or removed uniformly after attaching the wallpaper to the wall or ceiling surface, for example by a stripper having a rubber lip. According to the illustration of the drying behavior, in particular the first drying stage and, thus, the total drying time are advantageously reduced. In addition, this has an effect on the uniformity of the hanging of the wallpaper in the surface area thereof, which can also be perceived visually by the user as a quality feature of the final result. Even further, this advantageously causes a reduced height of the glue gap forming between the base layer and the wall or ceiling surface, which, according to the principles of adhesive technology, has a strengthening effect on the adhesion behavior and the total strength of the adhesive connection of the wallpaper to the wall or ceiling surface.

Yet another additional advantage of the afore-described preferred embodiment with the perforated structure or, resp., the pore structure of the base layer and, resp., the textile fabric is seen in an increase in the effect of a (dry) removability of the wallpaper desired according to the invention. For the adhesive layer formed on the wall side at the base layer and, resp., the textile fabric and being present in the dried or set state is intimately connected to and/or integrally and/or positively connected, due to its undercuts, to the perforated structure or the pore structure of the base layer and, resp., the textile fabric. In other words, the adhesive layer, in the case of the preferably perforated structure or the pore structure of the base layer and, resp., the textile fabric, is not only adhesively attached to the base layer or, resp., the textile fabric but is also positively connected to the latter. In other words, in the set state of the wallpaper glue, a, preferably partially positive-fit, base layer wallpaper glue structure is formed as a solid-solid structure. As a consequence, when removing the wallpaper together with the perforated base layer, also the adhesive layer is increasingly stripped off as well, at least for the most part, if not completely.

According to a preferred embodiment of the invention, the base layer may be a textile with a polyester portion of at least 50%, preferably a polyester portion of at least 70%, especially preferred a polyester portion of 100%. Polyester is a good compromise of a sufficiently high adhesive strength for reliable mounting of the wallpaper in connection with wallpaper glues and easy and complete removability of the wallpaper. Furthermore, polyester is available as a printable textile, in particular as a flag fabric and/or a textile wall covering, etc., which can be manufactured with a constant quality and at low cost. Polyester has an advantageously high breaking strength of 1000 to 1300 N/mm$^2$ (as compared to cotton, for example: 350 to 700 N/mm$^2$). The elongation at break of polyester is 10 to 18%. Moreover, polyester has an advantageously high modulus of elasticity of 10000-15000 N/mm$^2$ (as compared to cotton, for example: 4500-9000 N/mm$^2$).

However, the invention is not limited to polyester, apart from natural polymers, preferably synthetic polymers are taken into account, comprising particularly polyamide and/or polyacrylic and/or polypropylene. They offer the advantage of similar properties of spinnability, wetting and tear strength. In particular, functional polymers and, resp., polymer constituents may be comprised.

According to a preferred embodiment in a first variant, the base layer and, resp., the textile fabric may be a mesh fabric, preferably a knitted fabric. According to an alternatively preferred embodiment in a second variant, the base layer and, resp., the textile fabric may be a non-woven, preferably a laid structure, even more preferred a cross-laminated laid structure. According to another alternatively preferred embodiment in a third variant, the base layer or, resp., the textile fabric may be a, preferably stitch-woven, woven fabric. Accordingly, further preferably, the woven fabric may be in the form of plain weave, especially Panama weave, and/or a twill weave and/or a satin weave and/or as a grid weave. The specific selection of the preferred variant may help precisely adjust the application-related, especially the mechanical behavior of the base layer and, resp., the textile fabric, in particular the dimensional stability. Thus, properties relevant in terms of application such as the density, the pore structure, the tear strength, the robustness, etc. as well as properties further or possibly relevant in terms of printing such as the surface roughness, the wettability and the complete wettability with printing inks, etc. can be influenced and specifically adjusted in a simple manufacturing manner.

Textile fabrics or textile three-dimensional structures in which a loop formed by a thread or yarn is looped into another loop are referred to as mesh fabrics. The stitches resulting in this way can be formed using one (yarn) thread or plural (yarn) threads. The advantage of the use of mesh fabric compared to a woven or non-woven fabric, for example, resides in the elasticity provided by the knitted structure that improves the stripping characteristics and in the wrinkle resistance which improves the reusability of the wallpaper. In addition, hole patterns can be integrated particularly easily in a mesh fabric and gaps are usually formed already by the stitches.

Particularly preferred, the base layer may consist of knitted fabric. A substantial advantage of knitted fabrics resides in their comparatively high elasticity and high strength with low weight. The advantage of the knitted fabric compared to crocheted fabric moreover resides in the fact that the former is largely runproof and is thus more robust when stripping the wallpaper. In addition, the elasticity to strength ratio in knitted fabrics is especially suitable for the use as a wallpaper. If the elasticity is too high (or the modulus of elasticity is too low), motives on the wallpaper can be easily distorted during fixation.

Particularly preferred, a knitted fabric that is not a full-surface fabric may be concerned, i.e., each course of the knitted fabric may be provided with spaced holes. Further preferred, the holes of adjacent courses may be arranged offset against each other.

Further preferably, the mesh fabric, of preference the knitted fabric, is configured with a treble stitch. Mesh fabric refers to those textile flat structures or base layers in which the individual threads or filaments are processed to form a dimensionally stable structure by means of stitch-forming technologies. This results in an especially advantageous dimensional stability when attaching the wallpaper according to the invention to the wall or ceiling surface. The mesh fabric may be in the form of a single-yarn knitted fabric and/or single yarn crocheted fabric and/or as a warp-knitted fabric. In the single-yarn knitted fabric or single-yarn crocheted fabric, stitches juxtaposed in the transverse direction are produced by one yarn at a time. In a warp-knitted fabric, the yarn extends in the longitudinal direction across the knitted fabric. Alternatively, or cumulatively, the mesh fabric is preferred to be formed in the single-yarn system or two-yarn system or three-yarn system. The selection of the yarn system allows to specifically adjust properties relevant in terms of application such as the density, the pore structure, the tear strength, the robustness, etc. of the mesh fabric. Furthermore, or possibly, properties relevant in terms of printing such as the surface roughness, the wettability or complete wettability with printing inks etc. can be influenced in a simple manufacturing manner.

Alternatively, or cumulatively, stitch-knitted fabric may be preferred. Stitch-knitted fabrics are understood to be a yarn system made up of warp and weft yarns based on the principle of a laid yarn structure which is flatly sewn up by means of a complicated mechanism. Preferably, stitch fabrics can be characterized, as to their mechanical behavior, by linear placing of warp and weft yarns (for example as textiles marketed under the trademark MALIMO™). Stitch-knitted fabrics advantageously are particularly dimensionally stable. In an advantageous manner, they show the mechanical properties of the individual yarns in the case of tensile stress, i.e., without any interaction between the two yarn directions. In other words, stitch-knitted fabrics offer the advantage of a force-deformation behavior that is similar in the warp and weft directions.

It is the essential advantage of such a knitted fabric when used as a wallpaper base structure or base layer that, apart from the reduced adhesion by the hole pattern, it is also excellently suited for the digital printing process due to its homogeneity and its structure. In this way, on one side of the wallpaper that is later remote from the wall-side surface, prints having very high quality and uniformity of depiction can be made.

Within the scope of the present invention, it has turned out that, for example, the following technical qualities of polyester knitted fabrics are suitable as base layer for the wallpaper according to the invention: On the one hand, on the side of the textile manufacturer "Georg+Otto Friedrich GmbH" (Gross-Zimmern, Germany) under the type designations "StandardFlag KFL/6043KFL", Jetflag GS/6144GS" and, resp., "7137KGFS". On the other hand, on the side of the textile manufacturer "Gebrüder Aurich GmbH" (Radevormwald, Germany) under the type designations "No. 386" (three-yarn system) and, resp., "No. 254" (two-yarn system) and, resp., "No. 261" (two-yarn system; dense structure by use of textured yarn). In particular, said polyester knitted fabrics as the base layer excel by complete removability; in other words, without any residue remaining on the wall or ceiling surface. Accordingly, the preferred knitted fabrics not only do not tear, but can be removed without fraying. Thus, they offer the advantage of leaving not only no pieces of the wallpaper, but also no single filaments or pieces of filament pulled out of the base layer. Further advantageously, this enables excellent reusability, in particular after washing out the wallpaper glue. In terms of costs and environmental protection, this is a considerable advantage, inter alia in the application field of trade fair construction and for other applications of fast-moving decoration cycles such as for hotels.

Preferably, the base layer may be a non-woven (or non-woven textile fabric). This may preferably be a laid structure. A cross-laminated laid structure is even more preferred. The latter is manufactured, for example, by the textile manufacturer "JX Nippon ANCI", part of the Japanese "JXTG" group, under the type designation and registered trademark "Cross Laminated CLAF® Fabric" by means of cross-lamination technology. This allows for robust weight-optimized base layers, particularly also based on recyclable mono-material polymers.

Preferably, the base layer may be a, preferably stitch-woven, woven fabric. The woven fabric may be further preferred to be configured as a plain weave, especially Panama weave, and/or as a twill weave and/or as a satin weave. Within the scope of the present invention, it has turned out that, for example, the following technical qualities of woven polyester fabrics are suited as base layer for the wallpaper according to the invention: sold by the textile manufacturer "Gebrüder Aurich GmbH" (Radevormwald, Germany) under the type designations "No. 637" and, resp., "No. 624".

Alternatively, or cumulatively, the woven fabric is a mesh fabric. In particular mesh fabrics offer the advantage that they can have an especially high internal void volume portion with simultaneously high strength of the base layer. It is of advantage here that the wallpaper glue can wet in an especially proper uniform manner and can evenly penetrate the base layer.

In a preferred embodiment of the invention, it is of particular advantage that the spaces of the holes from each other are substantially identical, because this improves the uniformity of the printed design in digital printing. This is based on the fact that, thus, in the knitted fabric, an identical maximum space from the next hole is provided so that proper and even distribution of the printing inks is ensured. Advantageously, the holes may have a surface area ranging from 0.2 to 2 mm$^2$, preferably from 0.4 to 0.8 mm$^2$, for proper printability.

The base layer preferably is dimensionally stable. In particular, the base layer is preferred to be dimensionally stable even if the base layer or, resp., the textile fabric or, resp., the wallpaper is in a state in which it is wetted by a liquid and, resp., non-set wallpaper glue. So, it is especially advantageous when, due to a given dimensional stability in the glued state, (manual) movability of the still moist wallpaper is ensured. This is important, in terms of application, for the wallpapering user or craftsman to be able to move and align the wallpaper accurately on the wall and, resp., to adjust an optically seamless transition of a printed pattern along the edges of the wallpaper.

Preferably, the base layer is non-swelling with respect to water and/or with respect to the wallpaper glue present in the liquid and, resp., non-set state. This entails a special advantage over a conventional paper wallpaper implicitly requiring a swell time before the actual hanging of the wallpaper to the wall or ceiling surface, which considerably impairs the rate of the wallpapering operation and makes higher demands to the skills of the working user or craftsman. Further, with a preferably non-swelling base layer, the technical advantage is given that the wallpaper, and especially a pattern of the wallpaper, is not negatively subjected to distortion. Moreover, the setting time of the wallpaper glue is advantageously accelerated so that a room with a freshly wallpapered wall is more quickly available for use again.

Preferably, the base layer has a longitudinally definable first expansion coefficient at 100 N and/or a transversely definable expansion coefficient at 100 N which is less than or equal to 25%, preferably less than or equal to 15%, and especially less than or equal to 7%. This entails the advantage of a particularly high dimensional stability, in particular preferably uniform in both directions (longitudinal, transverse), if mechanical loads act upon the wallpaper. Further, this expansion behavior offers the advantage of a particularly proper machinability on printing machines, especially for rolled goods at high printing rates.

Preferably, the base layer and/or a textile yarn of the base layer and/or a single textile filament of the base layer has/have a tensile strength and/or tear strength of more than 800 MPa, especially more than 1,500 MPa and especially preferred more than 3,000 MPa. In this way, the complete removability, in particular without fraying, is supported.

Preferably, the base layer is removable, in a dried or set state of the wallpaper glue of the wallpaper attached to the wall or ceiling surface, almost or completely residue-free from the wall or ceiling surface. In this context, further preferred, a surface area of a non-removable residue of the wallpaper glue and/or of the base layer is less than or equal to 15%, especially preferred less than or equal to 7%, and particularly preferred less than or equal to 3%. Alternatively, or cumulatively, the non-removable residue is washable with water and/or a hydrophilic solvent and/or a surfactant washing composition. Alternatively, or cumulatively, a (required and/or maximum) tensile strength exerted in parallel to the, preferably planar, wall or ceiling surface on the base layer for removal is less than or equal to 80 N, preferably less than or equal to 70 N, and especially from 35 to 67 N. This allows the user to conveniently restore the wall or ceiling surface without any or with only minimum reworking. This is of advantage, for example, when moving, if the wall or ceiling surface must be delivered in its original state.

Preferably, the base layer has an internal void volume portion ranging from 2% to 90%, preferably from 5% to 85%, especially preferred from 10% to 80%, and particularly preferred from 20% to 60%. Thus, the wallpaper glue can especially properly wet the base layer and form a coherent structure by form closure with the base layer. This has a positive influence, on the one hand, on the sufficiently strong adhesion and, on the other hand, on the complete removability.

Preferably the following is applicable: A first wettability by water and/or by a hydrophilic solvent of the wallpaper glue on the wall or ceiling surface is better than on the base layer; a second wettability by a disperse portion of the wallpaper glue on the base layer is better than on the wall or ceiling surface. This may apply in particular in the state of the wallpaper wetted by the wallpaper glue which is in the liquid and, resp., non-set state.

Accordingly, this has the advantageous effect that, in the course of a possible drying operation for setting, the preferably polymeric portions of the wallpaper glue, preferably dispersion adhesive, wet the preferably polymeric base layer more strongly than the hydrophilic wall or ceiling surface (for example made from concrete, dry plaster, minerally plastered and the like). Therefore, the wallpaper glue tends to concentrate, during the setting operation, on a (surface-) physical and/or chemical viewing plane, toward the, comparatively more hydrophobic, base layer more strongly than toward the hydrophilic wall or ceiling surface. This effectuates and, resp., supports the removability of the wallpaper in the set state (ideally residue-less removability: without any residues of the base layer).

In addition, the afore-described higher wetting affinity of the polymeric portions of the wallpaper glue to the, comparatively more hydrophobic, base layer has the advantageous effect that when removing the wallpaper in accordance with removing the base layer as few residues in the form of remainders or fragments of the wallpaper glue as possible remain on the wall or ceiling surface.

Alternatively, or cumulatively, the first and/or second wettability is/are configured so that a height of a glue gap of the wallpaper glue forming in the liquid and, resp., non-set state between the base layer and the wall or ceiling surface is less than or equal to 100 nm, preferably less than or equal to 10 nm and especially about 1 nm. Thus, the adhesive bond is advantageously increased so that the wallpaper adheres to the wall or ceiling surface in a long-term stable manner.

Preferably, the wallpaper glue is provided as a liquid product stabilized with respect to a viscosity and/or a processing window of the wallpaper glue. Such liquid product is disclosed, for example, in publication EP 2 432 828 B1. The disclosure thereof is explicitly incorporated in the present disclosure by reference in order to avoid repetitions. For example, a liquid wallpaper glue is available from Henkel KGaA (Holthausen, Germany) under the type designation "Metylan Spezialkleister". Here it is of advantage that the wallpaper glue is used being formulated to be stabilized already in terms of its viscosity. Thus, a potentially quality-reducing influence of a viscosity build-up of the wallpaper glue otherwise variable in time after a (possibly wrong) mixing or stirring of a dry adhesive composition on the wetting of the base layer and, resp., the textile fabric is eliminated. Furthermore, by means of the specific formulation, a processing window is extended positively for the user. In total, the craftsmanship application as such as well as the quality assurance of the result to be achieved for the wallpaper will improve.

Preferably, the base layer has (or includes) a surface tension ranging from 18 to 55 mN/m, preferably from 25 to 50 mN/m, especially preferred from 28 to 40 mN/m and particularly preferred of about 30 mN/m. Thus, the (dynamic and/or static) wettability (according to a wetting angle or contact angle) and/or the adhesion of the wallpaper glue or at least a polymeric adhesive fraction thereof to the (or into the) base layer is further improved. This promotes the residue-free removability of the wallpaper from the wall or ceiling surface.

Preferably, the base layer can be cut at a cutting edge and/or without unraveling and/or without fraying while maintaining its textile surface structure. This offers the advantage of preventing the base layer and, resp., the wallpaper from being damaged by cutting. In particular, the base layer is prevented from being unraveled, which is undesired by the user, as a continuation of defects at the cutting edge. Also, by way of experiment, as will be detailed in the test series described further below by way of preferred embodiments of the wallpaper according to the invention, this has turned out to be advantageous in terms of craftsmanship handling during wallpapering as well as complete removal of the wallpaper.

Preferably, the base layer, in particular in the state wetted by the wallpaper glue that is in the liquid and, resp., non-set state, is configured to be permeable to air so that air bubbles enclosed when attaching the wallpaper to the wall or ceiling surface can escape and/or diffuse. This is especially useful for the user in the course of wallpapering. Further, this improves the overall quality of the craftsmanship result of the wallpaper.

Preferably, the base layer is configured to be permeable to air, especially in a dried or set state of the wallpaper glue applied to the base layer. Accordingly, further preferred, permeability to air is more than or equal to 1,000 l/m2 s, especially preferred more than or equal to 1,400 l/m2 s, and particularly preferred more than or equal to 1,900 l/m2 s. This is advantageous as this positively promotes good air circulation and a healthy living atmosphere. The air permeability moreover prevents moisture from condensing out undesirably between the wall or ceiling surface and the wallpaper.

Preferably, the base layer and/or the yarn thread of the base layer and/or the individual filament of the base layer has/have a flame-retardant finish. From aspects of fire protection requirements, advantages are resulting for the use as a wallpaper. It is known, for example, to carry out a test for inflammability for the building material class B1 "of low flammability" according to DIN 4102, part 1 (May 1998). Consequently, the wallpaper is preferred to meet the statutory requirements of this building material class, for which purpose the disclosure of the afore-mentioned related DIN standard is explicitly incorporated in the present invention by reference.

Even further preferred the base layer and/or the yarn thread of the base layer and/or the individual filament of the base layer (itself) is/are made from flame-retardant material and/or compound. I.e., already a single (yarn) thread and the starting material thereof before spinning are provided with an already flame-retardant function, i.e., before the textile fabric or the fabric used for the wallpaper is configured. Compared to an afore-mentioned flame-retardant finish, this embodiment shows the further particular advantage of the flame-retardant properties being intrinsic to the material. In this respect, the preferred flame-retardant property endures even a washing process of the wallpaper in a reliable secure manner. For example, organic halogen compounds are considered as flame-retardant additives.

Preferably, the base layer and/or the yarn thread of the base layer and/or the individual filament of the base layer is/are made from and/or with a functional specific textile material, preferably aramid and/or carbon and/or PTFE. Aramid fibers (such as materials marketed under the trademarks KEVLAR®, ARENKA™ and TWARON®) as specific fibers for high-technology products have an advantageously high breaking strength of up to 2,700 N/mm$^2$. The elongation at break is merely 2-4%. Moreover, aramid fibers advantageously have an especially high modulus of elasticity from 130,000 to 150,000 N/mm$^2$. Textile polytetrafluoroethylene or PTFE (such as materials marketed under the trademarks TEFLON®, HOSTAFLON™, POLYFLON®, TOYOFLON™) excels by excellent wet strength. Further, the removability is advantageously increased, as PTFE has an extraordinary anti-adhesive effect. Accordingly, it is further advantageous to the preferred embodiment of the wallpaper that PTFE is non-flammable in air, wherefrom particular advantages regarding fire protection are resulting. Further advantageously, high hydrophobicity (in correlation to the wetting behavior) and, irrespective thereof, high resistance to chemicals are mentioned. In addition, also carbon fibers offer the technical advantage of being categorized as virtually non-flammable. Further, they excel by an extremely low thermal expansion coefficient, which is beneficial within the scope of the present invention as regards wallpapering of those wall and ceiling surfaces which include heated areas, particularly heating pipes. The carbon fibers (such as fibers marketed under the trademarks CELION®, CARBOLON™, SIGRAFIL® and THORNEL®) excel by an advantageously high breaking strength of 2,000 to 3,000 N/mm$^2$. The elongation at break is <1%. Moreover, carbon fibers advantageously have an extraordinarily high modulus of elasticity of 200,000 to 500,000 N/mm$^2$.

Preferably, the base layer and/or the yarn thread and/or the individual filament is/are printable, in particular by means of digital printing and/or sublimation printing. As regards the optically achievable result of a wallpaper decorative for the user in a high-quality and simultaneously low-cost design, the present invention is not limited in any respect to a single one out of the printing methods known from the state of the art. It is particularly preferred to select the base layer and, resp., the textile fabric in terms of a printing method preferred by the user. Alternatively, and/or cumulatively, it is preferred vice versa to optimize or specifically select a printing method and/or printing inks with respect to a wallpaper with the base layer and, resp., the textile fabric according to the invention preferred by the user.

Preferably, the base layer and/or the yarn thread and/or the individual filament is/are washable at 40° C. Accordingly, washing shrinkage may be less than or equal to 3%, preferably less than or equal to 1.5%. This has an advantageous effect on the reusability or the recyclability of the wallpaper.

Preferably, a specific textile-functional finish and/or finishing treatment has been imparted by the manufacturer to the base layer and/or the yarn thread and/or the individual filament. Thus, the spectrum of specifically desired further technical functions is advantageously broadened, particularly regarding the applicable printing methods and/or printing inks and/or regarding the use as wallpaper.

Preferably, the base layer and/or the yarn thread and/or the individual filament is/are configured and/or treated to be anti-mycotic and/or anti-bacterial. This is especially advantageous from a health point of view, if the wall or ceiling surfaces are moist and when the wallpaper is used in living spaces.

Preferably, the base layer and/or the yarn thread and/or the individual filament is/are designed to be sound-insulating. This advantageously enables the use for wallpapering in otherwise noisy living rooms, as room dividers in open plan offices, in exhibition halls or production facilities with strong sound generation, and the like.

Preferably, the base layer is made from at least 50%, preferably more than or equal to 80%, especially preferred 100% of a biodegradable material and/or compound. In particular, a compound or a composition may comprise a, preferably recycled, polymer. Further preferred, starch and starch derivatives are considered as biodegradable materials and portions in the composition for the base layer. Thus, the wallpaper can be manufactured in a particularly sustainable and environmentally friendly way and may be better compostable.

Preferably, the base layer has (or includes) at least a first yarn thread extending substantially in a longitudinal direction of the wallpaper and a second yarn thread extending substantially in a transverse direction to the first yarn thread. The first yarn thread is designed to be different from the second yarn thread by at least one textile and/or physical distinguishing parameter. In particular, in the case of the base layer in the form of woven fabric, the first yarn thread may be a warp yarn of the woven fabric extending in parallel to a selvedge of the wallpaper; and the second yarn thread may be the weft yarn of the woven fabric. This offers the advantage that the base layer and, resp., the textile fabric can entail particular specifically different technical functions in a single or integral structure, while the integral textile structure and/or manufacture otherwise continues to be simple, even if those functions were possibly difficult to reconcile in one single yarn thread.

In particular, it is also imaginable that the base layer and, resp., the textile fabric in a height direction (thereof) form different portions of the two functionally different first and second yarn threads. Thus, different (surface-)physical and/or chemical properties can be specifically adjusted on the wall-side surface versus the surface remote from the wall of the base layer.

Accordingly, preferably the at least one distinguishing parameter may comprise the following parameters of the yarn thread and/or of the individual filament of the yarn thread: a thickness or a diameter. Alternatively, and cumulatively, the at least one distinguishing parameter is a material, in particular a polymer. Alternatively, or cumulatively, the at least one distinguishing parameter is a tear strength and/or a breaking strength. Alternatively, or cumulatively, the at least one distinguishing parameter is a modulus of elasticity and/or an expansion behavior. Alternatively, or cumulatively, the at least one distinguishing parameter is a surface tension. Alternatively, or cumulatively, the at least one distinguishing parameter is a (dynamic and/or static) wetting angle (or contact angle), in particular in terms of wettability by water and/or by the wallpaper glue in the liquid or non-set state. Alternatively, or cumulatively, the at least one distinguishing parameter is a (dynamic and/or static) wetting angle (or contact angle), in particular in terms of wettability by the disperse portion of the wallpaper glue in the liquid or, resp., non-set state and/or in the dried or, resp., set state. Alternatively, or cumulatively, the at least one distinguishing parameter is a textile finish and/or after-treatment. Alternatively, or cumulatively, the at least one distinguishing parameter is a printability (particularly printing inks and/or methods).

According to a preferred embodiment of the invention, the wallpaper may be a large wallpaper. The wallpaper may particularly be configured as a one-piece rectangular flat structure having respective side lengths of more than 2 m. As an alternative, also any other shape for said large wallpaper is possible. The use of a synthetic textile base material and, resp., a cut base layer according to one of the afore-mentioned embodiments enables large (wall-covering) wallpapers, which are sufficiently stable but still comparatively light-weight, to be manufactured in one piece. The one-piece design of the wallpaper can significantly facilitate mounting and attaching to a wall or ceiling surface, as the laying of webs is omitted. This preferred embodiment of the large wallpaper also offers plural advantageous applications not only in the field of interior design of residential and office buildings but also in exhibition stand construction, decoration and design of facades, for advertising spaces etc.

According to a preferred embodiment, the synthetic textile material of the base layer may have a weight per unit area of less than 200 $g/m^2$ in order to maintain the weight within a manageable range even for large-area wallpapers. Preferably, the material may have a weight per unit area ranging from 60 $g/m^2$ to 180 $g/m^2$, even more preferred from 105 $g/m^2$ to 125 $g/m^2$. This weight range offers a good combination of sufficient strength for non-destructive removal and a low mounting weight. The textile can preferably be fabricated from polyester yarns from 100 to 200 dtex, preferably 160 dtex.

According to another preferred aspect of the invention, the textile base layer may be printed, in particular with a dispersion ink in the sublimation printing method or in the latex printing method. In this way, a particularly simple provision method is facilitated in which the preferred synthetic textile described according to the afore-described embodiments serves as a semi-finished product for a number of wallpapers on each of which a different motive is printed. Printing with dispersion inks has turned out to be especially advantageous for the materials selected and the nature of the base structure.

Another aspect of the invention relates to a mounting kit, referred to herein as "Easy-Kit", comprising a wallpaper according to any one of the afore-mentioned aspects and a defined amount of wallpaper glue as well as a number of mounting clips. Further optional constituents of the mounting kit may be a brush and a scalpel with a stencil.

Another aspect of the invention relates to a method for providing a reusable wallpaper, in particular a wallpaper according to any one of the afore-mentioned aspects. Said method includes at least the following steps of: retrieving or determining a desired height dimension and a desired width dimension; adapting, particularly cutting, a textile semi-finished product according to any one of the afore-mentioned aspects to a flat structure having the retrieved or determined dimensions; and, where necessary, printing a motive onto the adapted flat structure.

This providing method allows to offer, at low cost, a wide range of various reusable wallpapers, as merely a base layer variant or textile variant must be provided which then can be printed and cut to any size.

Of preference, four different derivations of the support material are possible depending on the application:
  washable (basic);
  UV resistant;
  including primer; and
  including shining surface.

In other words, wallpaper dimensions desired by the customer such as the surface measures of a wall surface to be wallpapered can be retrieved. Based on said retrieved dimensions, a large wallpaper having said dimensions is then cut out of a large roll or the like of the textile semi-finished product (of preference the knitted polyester fabric). If desired, a motive or pattern can be printed on the wallpaper before or after cutting.

According to a preferred development, the motive can be printed on the adapted flat structure in digital printing, particularly in the sublimation printing method.

According to a preferred embodiment, the afore-described method can be supplemented by at least one of the following steps for providing a mounting kit: providing a defined calculated amount of glue based on the retrieved or determined dimensions of the wall or ceiling surface to be covered; and providing a number of mounting clips depending on the retrieved width of the wallpaper.

Another and, where appropriate, independently claimable aspect of the invention relates to a wallpaper configured as a painting wallpaper. This is a fabric wallpaper, especially according to any one of the afore-mentioned aspects having a paintable primer. In addition, said wallpaper includes a film layer or background film preferably integrally formed in and/or knitted into the base layer which seals the wall from the paintable primer in a fluid-tight manner. In other words, for protecting the wall against any influence on the initial state of the wall, an intermediate layer (or an edge layer) in the form of a (plastic) film can be added. According to a preferred example embodiment, drawing patterns can be printed on said painting wallpaper so that the latter then can be painted with water-soluble felt pens, for example. After making use of the painting wallpaper, the same can be returned to the original state in the washing machine and can be re-attached to the wall for painting. Accordingly, it is noted that the washability is limited to 3 to 5 washes for each painting wallpaper. This relates to the printed drawing patterns which are weakened with each wash. If the drawing pattern is completely washed out, the unlimited use as a painting base without a drawing pattern is maintained.

Summing up, it could be stated that the use of a textile, in particular of a mesh fabric, further preferred of a knitted polyester fabric, as base material for a wallpaper and, resp., providing such textile for use as a wallpaper is a main aspect of the present disclosure. Advantageously, the used textile may be a knitted polyester fabric having a uniform pattern of additionally introduced/incorporated smallest holes to provide easy removability from the wall and good printability.

BRIEF DESCRIPTION OF THE DRAWING FIGURES

In the following, example embodiments of the present disclosure are described based on the pertinent figures:

FIGS. 4A to 4G illustrate steps to mount or attach a wallpaper by a mounting kit according to the preferred embodiment of FIG. 3;

DETAILED DESCRIPTION

Figure 1:
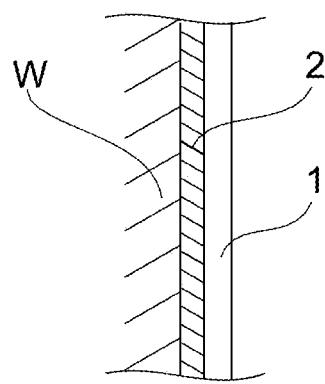
FIG. 1 is a sectional view of a state-of-the-art wallpaper mounted on a wall.

FIG. 1 illustrates a conventional wallpaper 1 as known from the state of the art. More precisely, it is a paper wallpaper 1 that was glued in webs to a wall surface W by means of a glue (layer 2).

Those wallpapers have the drawback that it is complicated to cover the wall with heavy paper or nonwoven webs and that it is just as complicated to completely remove the webs from the covered wall surface again.

Applicant surprisingly found that, when using particular textile materials as base material for a wallpaper 1, especially advantageous properties are resulting, which shall be illustrated in detail in the following.

Figure 2:
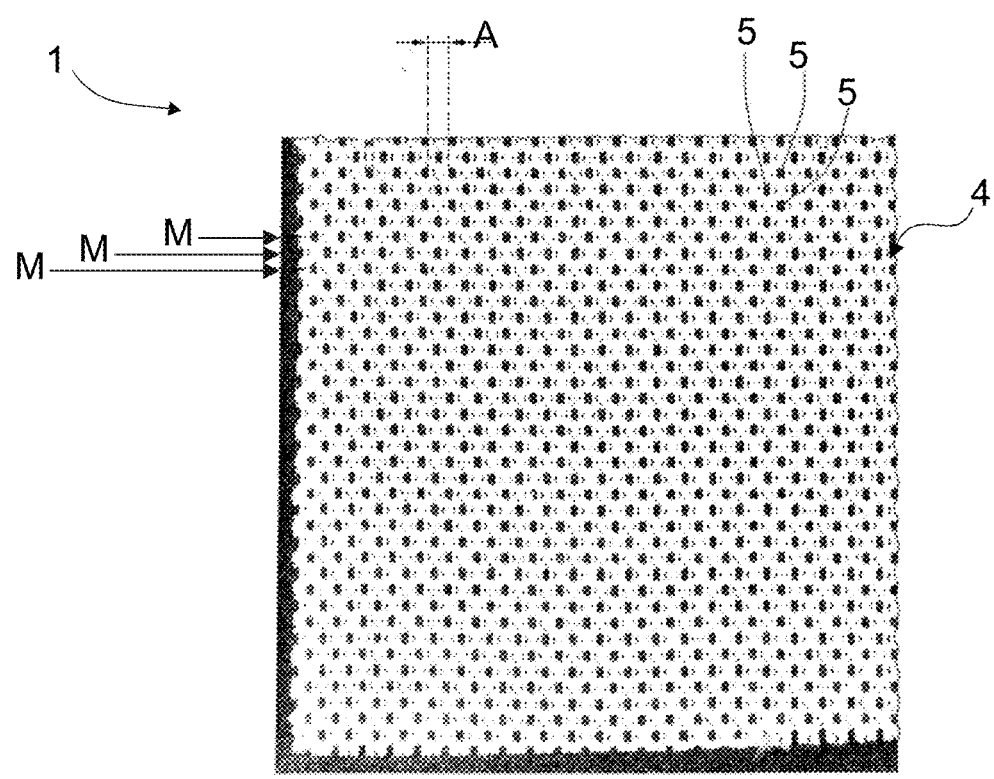
FIG. 2 is an enlarged representation and, resp., top view of a base layer of a wallpaper according to a first preferred embodiment of the invention.

The substantially rectangular (sole) base layer 4 of a wallpaper 1 according to a preferred example embodiment of the invention as shown enlarged in FIG. 2 consists of a knitted polyester fabric having a weight per unit area ranging from 60 g/m² to 180 g/m². Two particularly preferred textiles for use as base layer 4 are, on the one hand, a white (non-dyed) knitted polyester fabric (100% polyester) having a thickness of 0.18 mm and a weight per unit area of 67 g/m², and a white knitted polyester fabric having a thickness of 0.38 mm and a weight per unit area of 176 g/m². In the enlarged representation of the textile base layer 4 in FIG. 2, apart from the stitch courses M also holes 5 are visible which are uniformly knitted into the structure of the base layer 4. Moreover, FIG. 2 shows that the holes 5 in the preferred embodiment are knitted uniformly spaced from each other in each stitch course M at a space A. The equidistant courses of holes 5 are arranged to be offset against each other in respective adjacent stitch courses M. The individual holes 5 in the shown embodiment have a surface area of about 0.4 mm². The structure including (micro) holes has turned out to be particularly advantageous for use as wallpaper 1, as said structure entails a lower weight of the wallpaper 1 and moreover reduces the effective adhesive surface, thus allowing the wallpaper to be easily stripped off a wall or ceiling surface covered with the same even in the dry state. A preferred hole area to full area ratio ranges from 1:10 to 1:5.

The textile used as base layer 4 of the wallpaper 1 has a lower weight than conventional wallpapers, thus facilitating the handling during mounting. In addition, the holes cause, as mentioned already, a significant reduction of the adhesive surface between the base layer 4 and the surface W to be covered, wherein the viewer nevertheless gets an overall aesthetic impression due to the distance to the wallpaper 1, as the recess or the holes 5 are no longer visible to the naked eye even at a small distance. In the case of uniform hole patterns such as the one according to the preferred embodiment, moreover good printability of the fabric is maintained. In addition, the wallpaper 1 dries faster and the manufacture thereof is more cost-efficient, as the knitted fabric is not fully covered.

The wallpaper 1 according to the preferred example embodiment is made from polyester. Synthetic textiles made from this material are highly resistant, tear-proof and durable. At the same time, they are robust and easy to clean, because they are washable. It is moreover favorable that polyester has a low weight and can be easily printed. The fabric absorbs little moisture and is mildew-proof, which is advantageous for the use as base material of a wallpaper.

Hereinafter, a preferred method of providing a reusable (large) wallpaper 1 according to the afore-described embodiments of the invention shall be illustrated.

At first, the dimensions of the desired wallpaper are retrieved via an (online/internet) configurator, for example. E.g., height and width dimensions of the wall surface W to be covered can be retrieved. In this way, a large wallpaper 1 can be provided for covering an entire wall surface W in one piece, eliminating the need for laborious laying of webs and the need for a pasting table and allowing the wallpaper 1 to be removed in one piece again.

The retrieved values are used to cut a textile semi-finished product—i.e., a material (knitted polyester fabric) as afore-described—to the desired dimensions so as to produce the base layer 4 of the wallpaper 1.

In a next (optional) step, a pattern or motive equally chosen in the (online/internet) configurator (or provided/uploaded by the user) can be printed on the cut base layer 4 in a digital printing method, more precisely in a sublimation printing method, to complete the wallpaper 1.

Figure 3:
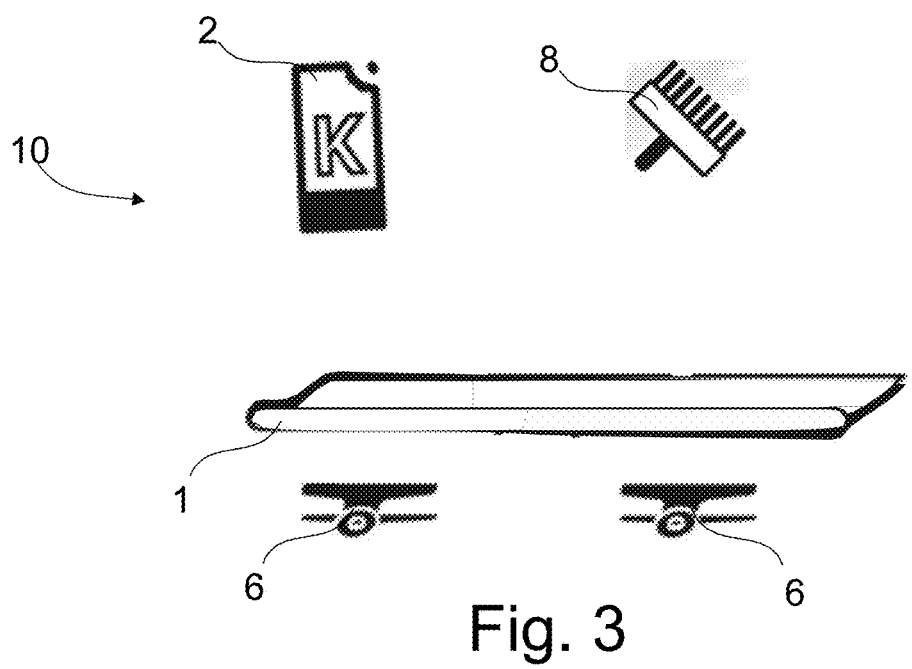
FIG. 3 is a representation of a mounting kit for a wallpaper according to a preferred embodiment of a further aspect of the invention.

According to a preferred aspect of the invention, the reusable wallpaper 1 is provided in a mounting kit 10 (referred to herein as "Easy-Kit") schematically shown in FIG. 3. The Easy-Kit 10 basically consists of a defined amount of glue 4, a number of mounting clips 6, a ceiling brush 8, a scalpel (not shown) as well as an aluminum L-profile of 30 cm in length (not shown). Optionally, depending on the width of the motive, another package of glue and another mounting clip are added to the Easy-Kit.

The glue 2 is added to the mounting kit 10 in defined units (here: 200 g). Depending on a surface area determined based on the retrieved dimensions, a number of glue units is calculated which is contained in the mounting kit 10.

The glue added to the mounting kit 10 is based on cellulose and starch, but at the same time also portions of synthetic resin (in this case a polyvinylchloride resin) are added to increase the initial adhesion and the adhesive performance. This guarantees that even large-area wallpapers 1 can be processed without coming off the wall again afterwards.

Hereinafter, an exemplary method for covering a wall W with a wallpaper 1 and with the aid of a mounting kit 10 according to the afore-described embodiment will be explained.

Figure 4E:
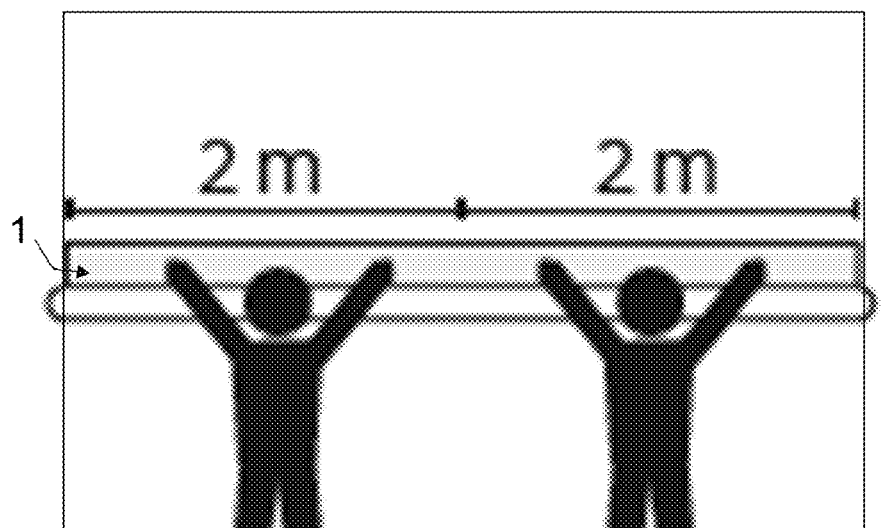

As shown in FIG. 4A, at first the glue 2 supplied within the mounting kit 10 is stirred with water free from lumps.

After a swell time, the glue 2 is generously applied to a wall W to be wallpapered by means of the brush 8 supplied within the mounting kit (see FIG. 4B).

The wallpaper 1 can be delivered and, resp., stored in the folded state. For easier attaching to the wall, in a next step the wallpaper 1 is rolled up except for a predetermined projection (here 20 cm) (see FIG. 4C). The rolled wallpaper is fixed by means of the clips 6 of the mounting kit 10 so that the wallpaper cannot unroll (see FIG. 4D). Accordingly, one clip 6 is used to fix 2 m of wallpaper width.

The projection is aligned in parallel at the adjacent edge of the wall W and is pressed onto the glued wall.

Figure 4F:
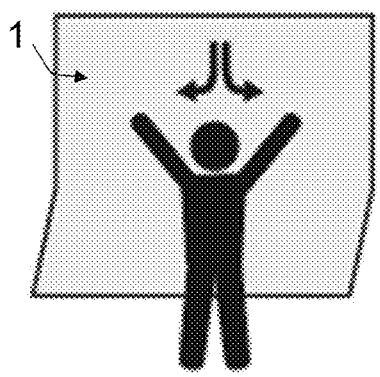

As is shown in FIG. 4F, the clips are released (as soon as the projection is fastened along the entire width) and the wallpaper 1 is unrolled by a particular length (e.g., 20 cm) and is fixed by the clips 6 again. Now the wallpaper 1 is tightened at a small distance from the wall W and then is pressed onto the wall W. Subsequently, the wallpaper 1 is smoothed out against the wall W. This operation is repeated until the wallpaper is completely fastened to the wall. Excess glue residues outside the area of the wallpaper must be removed with the aid of a towel.

Figure 4G:
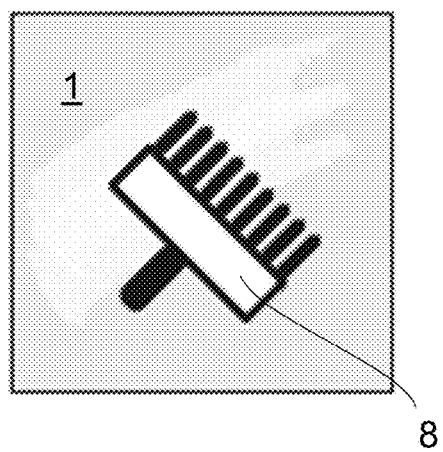

In a last step shown in FIG. 4G, the entire wallpaper 1 is once again coated with glue 2 by means of the brush 8.

The use of the clips 6 allows for easy mounting even in the case of very wide wallpapers 1. Of preference, one person can assist per running 2 m of wallpaper width.

The wallpaper 1 can be removed residue-free and non-destructively without using any tool and without any (chemical) substances. The removed wallpaper 1 can be washed, stored (in the folded state) and redecorated somewhere else. The removed wallpaper 1 can be replaced by a different wallpaper 1, e.g., having a different motive. In this way, a "change of scene" can be easily and very quickly carried out.

Figure 5A:
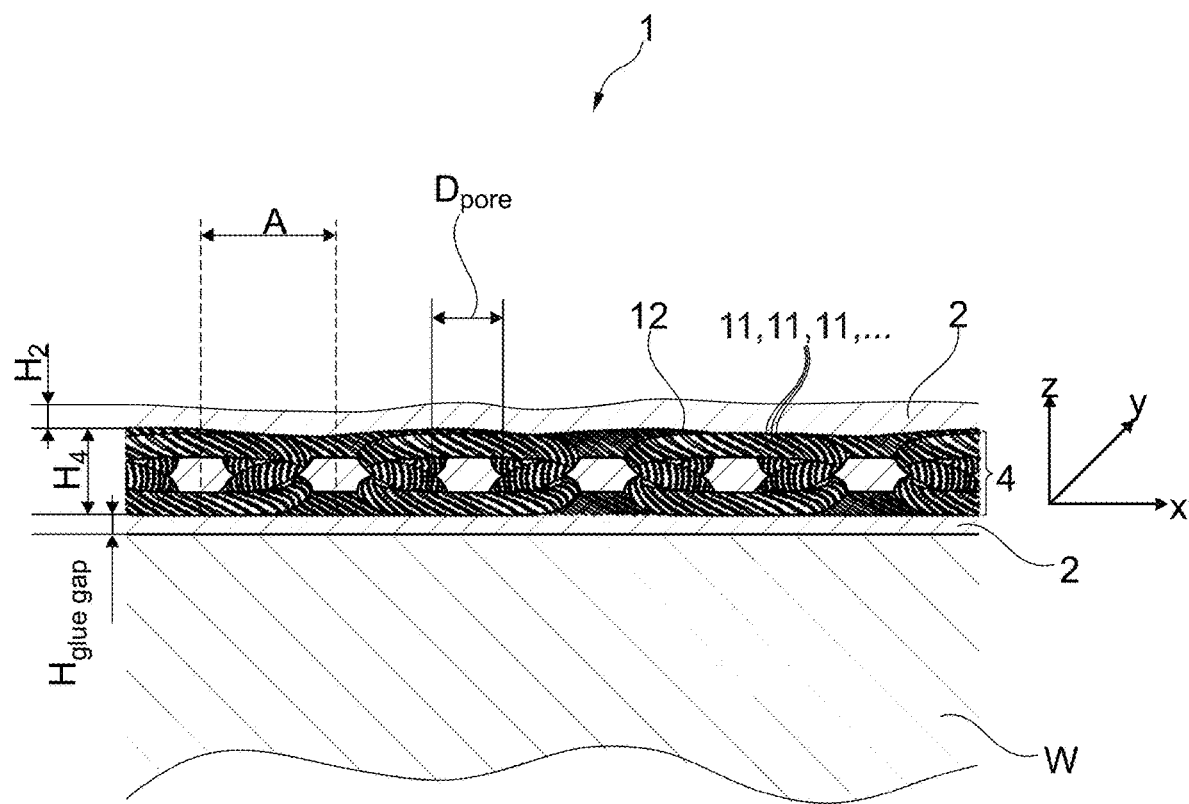
FIG. 5A is a schematic sectional view of a wallpaper mounted on a wall according to a second preferred embodiment of the invention.
Figure 5B:
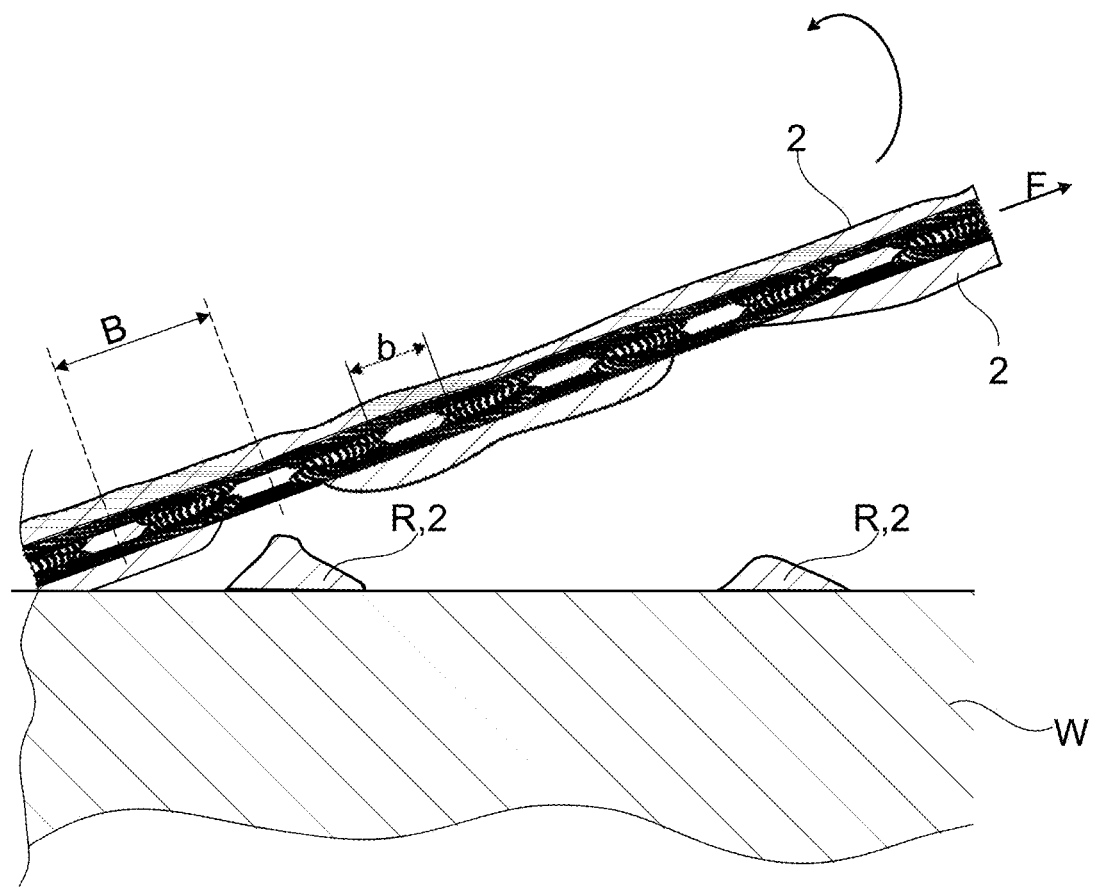
FIG. 5B is a schematic sectional view of the wallpaper according to the second preferred embodiment for illustration of the state when removing the wallpaper from the wall.

FIGS. 5A and 5B illustrate a schematic sectional view of a wallpaper 1 according to a second preferred embodiment of the invention, this embodiment relating to the wallpaper 1 having one (single) base layer in the form of a knitted fabric 4 (or mesh fabric 4). On the one hand, FIG. 5A shows a state in which the wallpaper 1 is mounted on and, resp., glued to a wall surface W. The schematic exemplary representation of FIG. 5A basically comprises all states in which a wallpaper glue 2 has (completely) wetted the base layer 4 as well as the wall surface W. In other words, irrespective of how far advanced the process of setting of the wallpaper glue, i.e., in the case of wallpaper glue present as dispersion adhesive: of drying of the wallpaper glue, is to be regarded.

On the other hand, FIG. 5B shows a later state in which the wallpaper 1 and, resp., the base layer 4 is removed from the wall surface W again or, resp., is stripped by applying an especially manually exerted tensile force or removing force F.

The knitted fabric 4 (or mesh fabric 4) extends as an elongate web fabric, for example in a roll assembly, in a longitudinal direction x, particularly for forming the height of a wallpaper web of the wallpaper 1. Free from mechanical tensile forces, the original textile basic structure related to the knitted fabric 4 becomes clear virtually unchanged even in the state coated with the wallpaper glue 2 shown here: The knitted fabric 4 has a height of the base layer $H_4$ corresponding to the fabric thickness of the knitted fabric 4 in a height direction z. Accordingly, the knitted fabric 4 further extends in a transverse direction y, in particular for forming the width of a web of the wallpaper 1. From one yarn thread 12 (infinite by approximation) a plurality of the looped and knitted stitches of the knitted fabric 4 is formed. The yarn thread 12 in this context is twisted out of a plurality of individual strands 11, 11 as individual filaments of a polymeric spinning fiber. The plurality of stitches of the knitted fabric 4 forms a plurality of loop-shaped holes or pores. They have a (mean or nominal) stitch diameter $D_{pore}$ as diameter of the hole. The plurality of the stitches of the knitted fabric 4 is arranged regularly at a first space equal (on average or virtually, at least along any sectional plane) between the holes A by the textile manufacturing process.

A wallpaper glue 2 applied to the wall W to be wallpapered as wall or ceiling surface and being in the liquid, such as freshly stirred, state, for example from the category of the dispersion adhesives, wets the wall-side surface of the knitted fabric 4 after attaching the wallpaper 1 to the full surface of the wall W. In this way and, resp., subsequently, a glue gap having a height of the glue gap $H_{glue\ gap}$ as adhesion-promoting intermediate layer (not shown true-to-scale, can ideally spread or lie in the nanometer range). The adhesion promotion is sufficiently high already in the still non-set, viz. liquid, state of the wallpaper glue in order to prevent the wallpaper 1 from slipping or falling from the wall W because of its dead weight. The still liquid wallpaper glue 2 wets the plurality of the stitches having the stitch diameter $D_{pore}$ and (almost) completely penetrates the knitted fabric 4 in an internal void volume. An excess of wallpaper glue 2 exits the stitches to form an (e.g., closed) surface film having a height of a wallpaper glue layer $H_2$ remote from the wall on the side of the knitted fabric 4 remote from the wall.

In the following, the wallpaper glue 2 sets for forming the final adhesive compound. This can be achieved especially by evaporation of an aqueous portion or a moisture of the wallpaper glue 2 into the environment and, resp., by drying of the wallpaper 1 according to the invention. Evaporation into the ambient air is determined particularly by material transport operations (in particular diffusion, solubility etc.) inside (the matrix) of the wallpaper glue 2. Accordingly, a variability of the drying or setting process of the wallpaper glue 2 along the height direction z and/or along a time axis (or in time) has to be assumed.

In the course of a drying operation for setting, where necessary, the polymeric portions of the wallpaper glue wet the polymeric knitted fabric 4 more strongly than the hydrophilic wall (concrete, gypsum, minerally plastered, etc.). As a result, the wallpaper glue tends to concentrate more strongly toward the knitted fabric 4 than toward the wall during the setting process, from a (surface-)physical and/or chemical point of view. This causes or supports the removability of the wallpaper 1 in the set state (ideally residue-free removability: without any residues of filaments 11 and/or yarn thread 12).

Moreover, the afore-described higher wetting affinity of the polymeric portions of the wallpaper glue to the polymeric knitted fabric 4 has the advantageous effect that, when removing the wallpaper 1 as illustrated in FIG. 5B, in accordance with removing the knitted fabric 4 as few residues R in the form of remainders or fragments of the wallpaper glue 2 as possible will remain on the wall W.

FIG. 5B further illustrates that a removing force F applied as tensile force causes removal of the wallpaper 1 at a (by far) later point-in-time. The tension vector preferably can have a small vector part in the height direction z. In other words, the wallpaper 1 can be ideally stripped in a planar manner. I.e., preferably the wallpaper 1 and, resp., the knitted fabric 4 is stripped or removed by a tension vector (portion) exerted in (or close to) a plane spanned by the longitudinal direction x and the transverse direction y.

FIG. 5B further illustrates that the removing force F applied as tensile force slightly stretches the knitted fabric, resulting in an appropriately stretched second space between the stretched holes B. A ratio between the second space B and the first space A is determined from a textile expansion behavior inherent to the knitted fabric 4 and/or a dimensional stability related to the knitted fabric 4. The latter may be dependent on the direction, for example, and/or do not correlate linearly (not according to Newton) to the removing force F applied as tensile force. Further, the hole dimensions of the plurality of stitches change to form a (mean or nominal) diameter of a stretched hole b.

FIG. 5B further illustrates that, by the wetting of the wallpaper glue 2 into the (holes of the) knitted fabric 4, in the set state of the wallpaper glue at least partially undercutting solid-solid structures or base layer-wallpaper glue structures are formed. This supports a, preferably complete, removability of the wallpaper 1 from the wall W which is ideally free from residues R. In other words, the wallpaper glue 2 can be stripped off the wall W together with the knitted fabric 4 and, resp., the base layer.

Figure 6A:
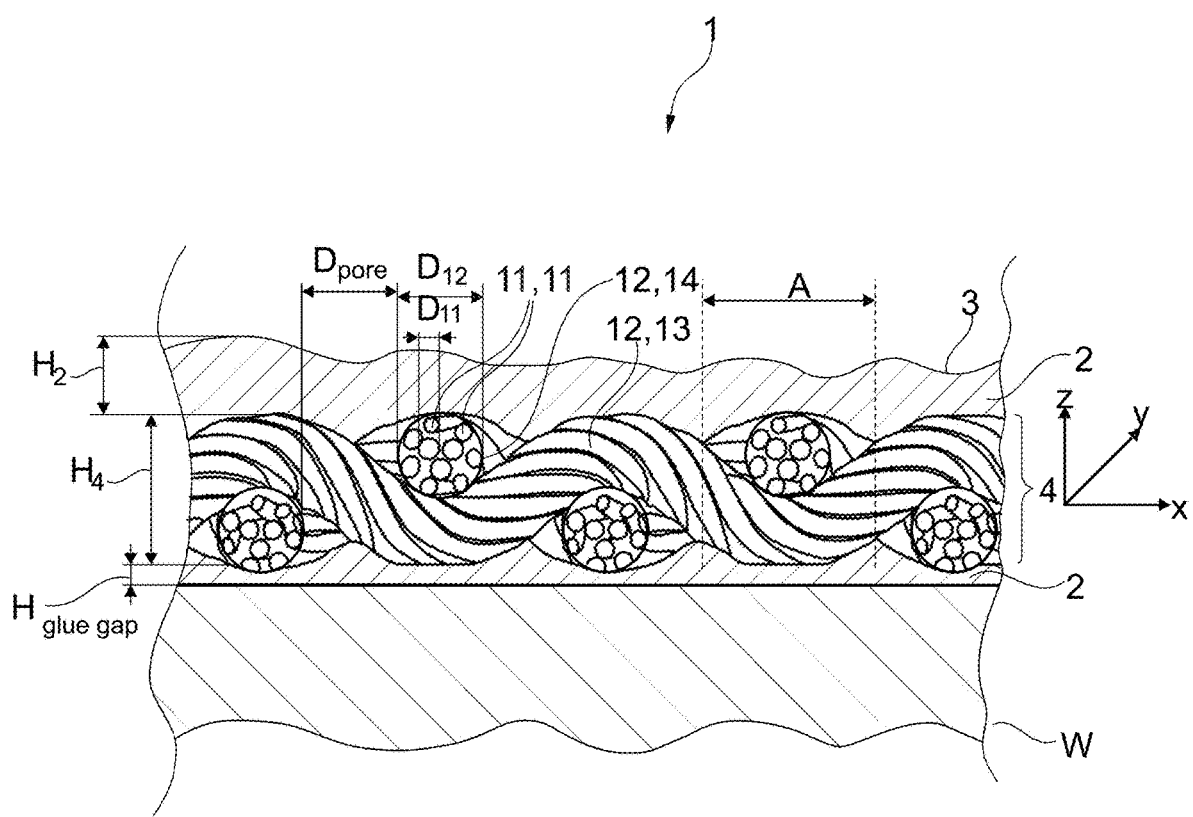
FIG. 6A is a schematic sectional view of a wallpaper mounted on a wall according to a third preferred embodiment of the invention.
Figure 6B:
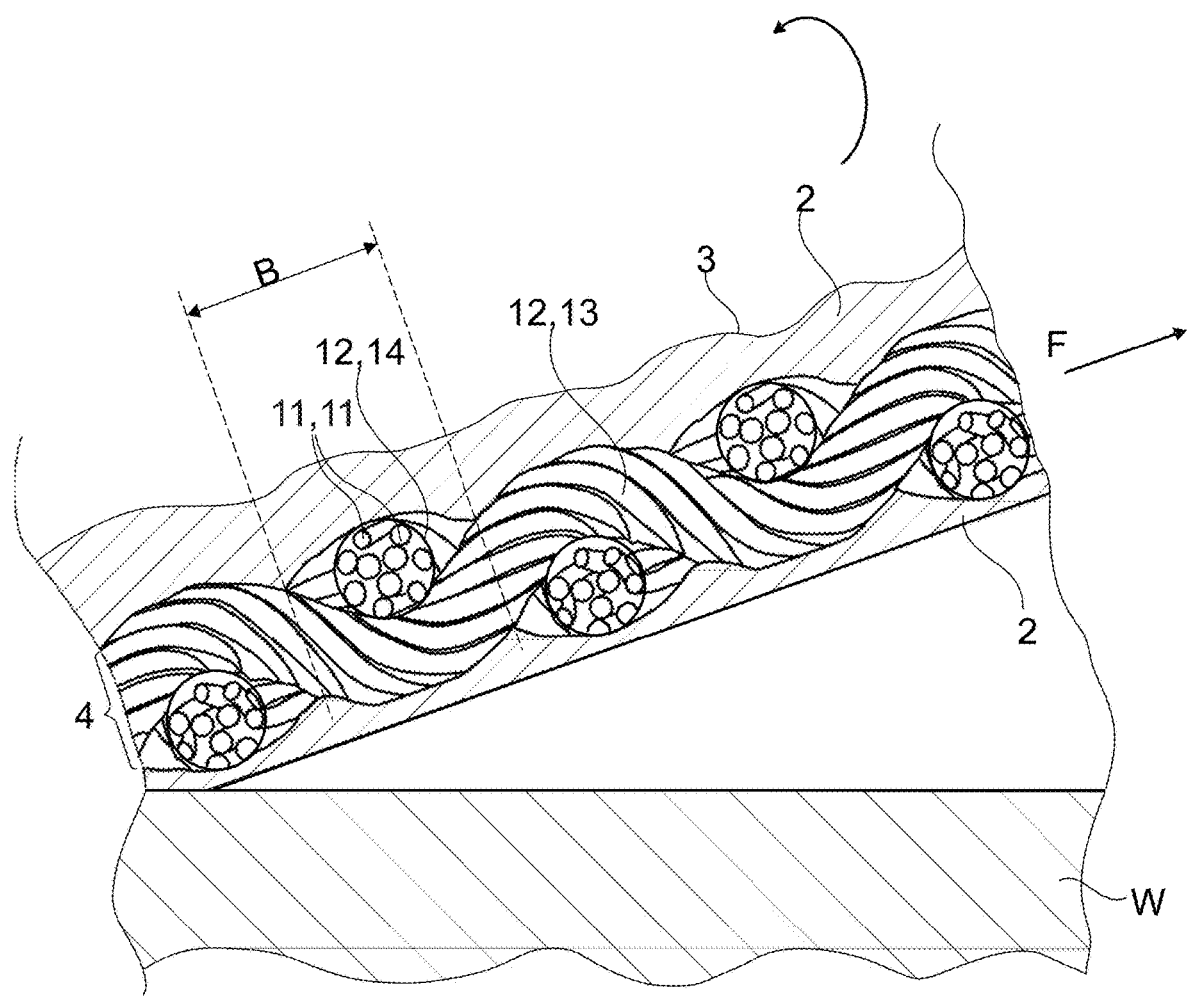
FIG. 6B is a schematic sectional view of the wallpaper according to the third preferred embodiment for illustration of the state when removing the wallpaper from the wall.

FIGS. 6A and 6B illustrate, analogously to the FIGS. 5A and 5B for the second preferred embodiment, a schematic sectional view of a wallpaper 1 according to a third preferred embodiment of the invention, wherein this embodiment relates to a wallpaper 1 having a base layer configured as a woven fabric 4 rather than a base layer configured as a knitted fabric. In this respect, reference numerals similar to those of FIGS. 5A and 5B denote like features or parts and effects, and the foregoing description is referred to regarding the common features or parts and effects.

The woven fabric 4 extends as an elongate web fabric, such as in a rolled assembly, in a longitudinal direction x, particularly for forming the height of a wallpaper web of the wallpaper 1. In this way, it can be printed in a continuous printing machine, such as in a roller printing method such as offset, sublimation, etc., at very high web rates equally in the longitudinal direction x.

The base layer configured as woven fabric 4 has (at least) one (possibly infinite) warp yarn 13 in a longitudinal direction of the woven fabric 4 and (at least) one (possibly infinite) weft yarn 14 in a (substantially) transverse direction y of the woven fabric 4. In other words, the warp yarn 13 is crossed by the weft yarn 14 in a, preferably right-angled, crossing yarn system for forming a textile fabric. By mutual integration of the warp yarn 13 and the weft yarn 14, the woven fabric 4 is dimensionally stable. Furthermore, FIG. 6A illustrates, especially in comparison to the analogous FIG. 5A for the second embodiment with a base layer in the form of a knitted fabric, that the optionally close tight weaving implies the fact that comparatively narrow gaps or holes having a smaller diameter of the hole $D_{pore}$ are formed between the crossing points of the warp yarn 13 and the weft yarn 14. Also, in FIG. 6A an void volume portion of the knitted fabric 4 is illustrated which appears to be smaller vis-á-vis the void volume portion of the knitted fabric 4 shown in FIG. 5A.

Given otherwise comparable conditions, it follows from the above that a different proportional height distribution of the wallpaper glue 2 is resulting, if in the area of the height $H_4$ of the knitted fabric 4 there is little (less) space for (an excess of) wallpaper glue 2. Compared to the situation shown in FIG. 5A (for the knitted fabric), in this way the height of a wallpaper glue layer $H_2$ remote from the wall and/or the height of the glue gap $H_{glue\ gap}$ are formed to be more definite and elevated, resp., for the woven fabric 4.

FIG. 6A shows the non-limiting example that the warp yarn 13 and the weft yarn 14 of the knitted fabric 4 are made from a yarn thread 12 equal as regards the inner and/or outer dimensions. The diameter of the yarn thread $D_{12}$ results from the diameter of the bundle of the plurality of individual fibers 11, 11 as filaments each of which has a diameter of the filament $D_{11}$.

Figure 7A:
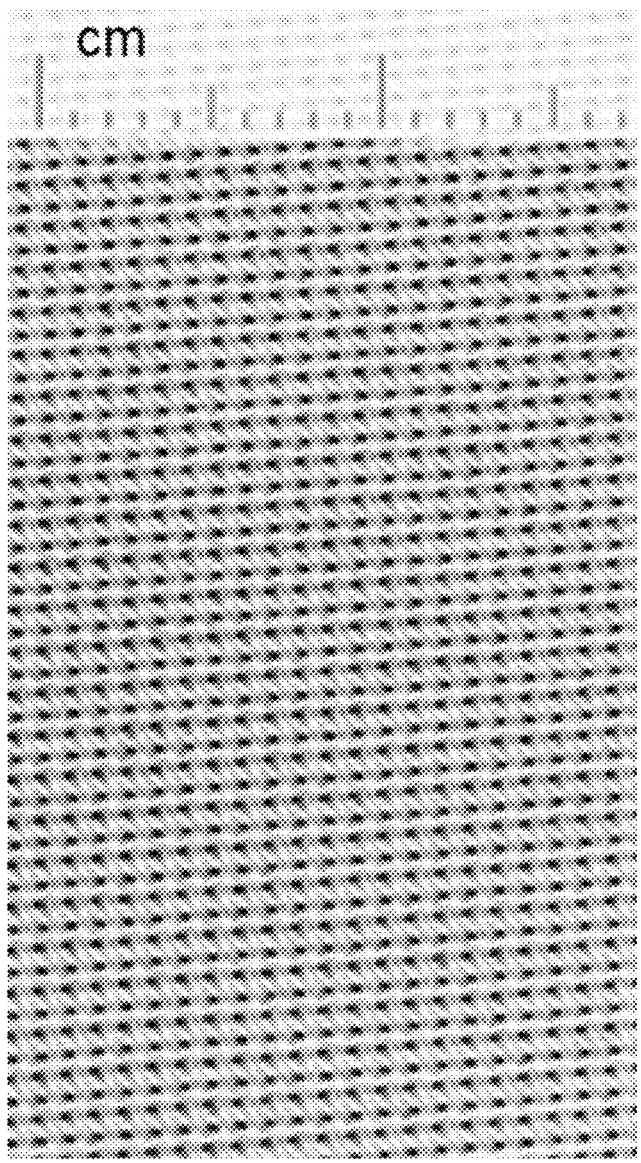
FIGS. 7A to 7C show enlarged top views of a base layer of a wallpaper in the form of knitted polyester fabric according to further preferred embodiments of the invention.
Figure 7B:
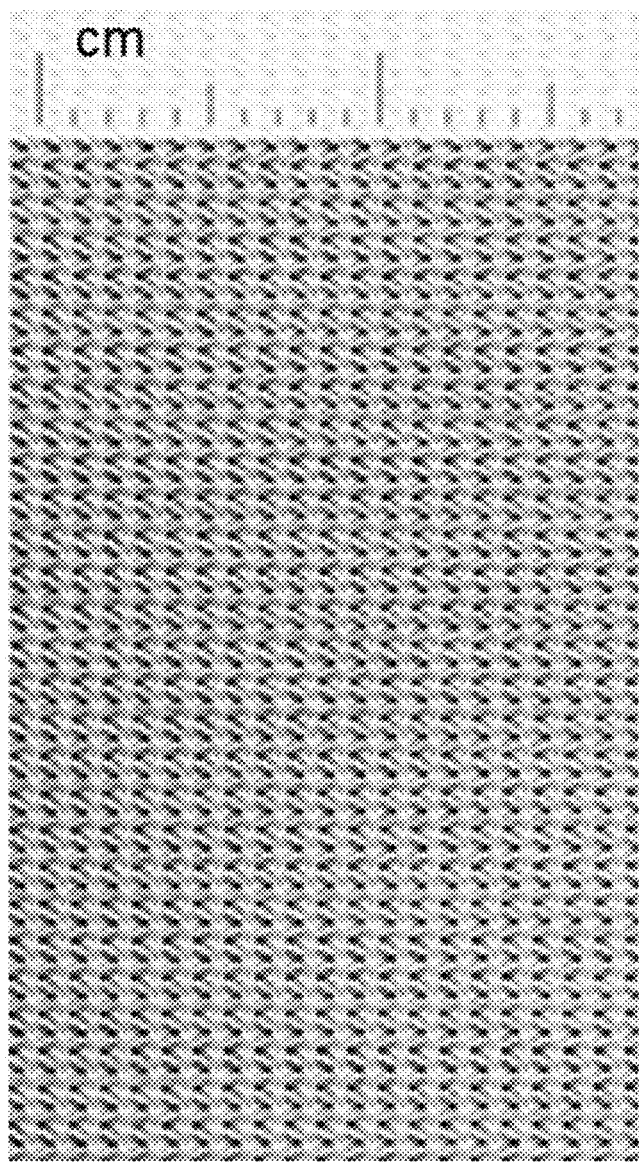
Figure 7C:
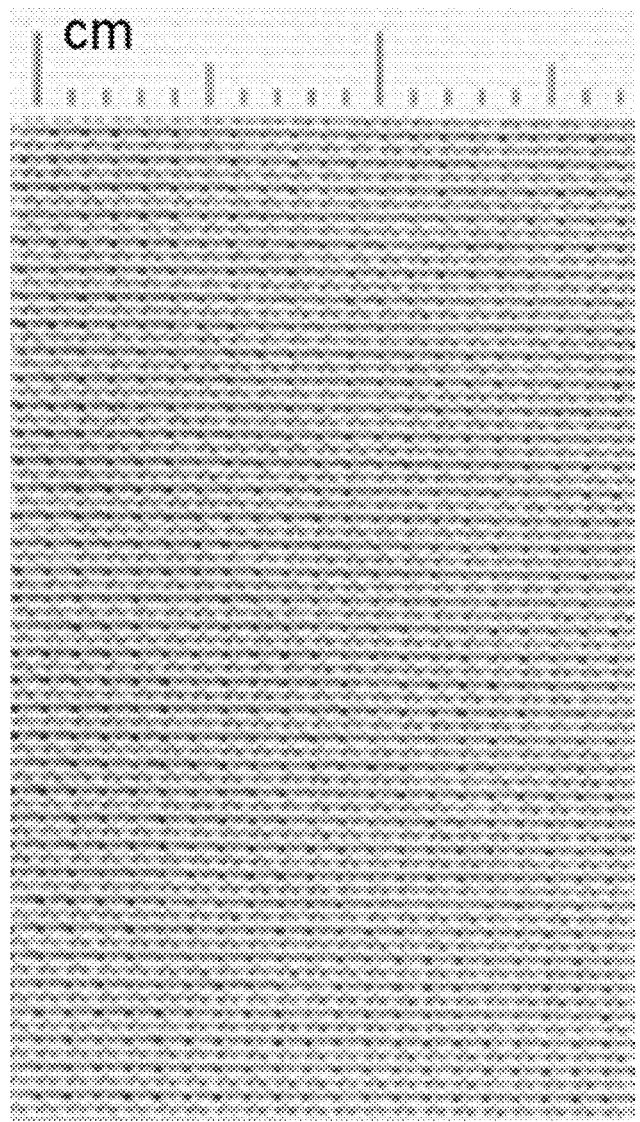
Figure 8A:
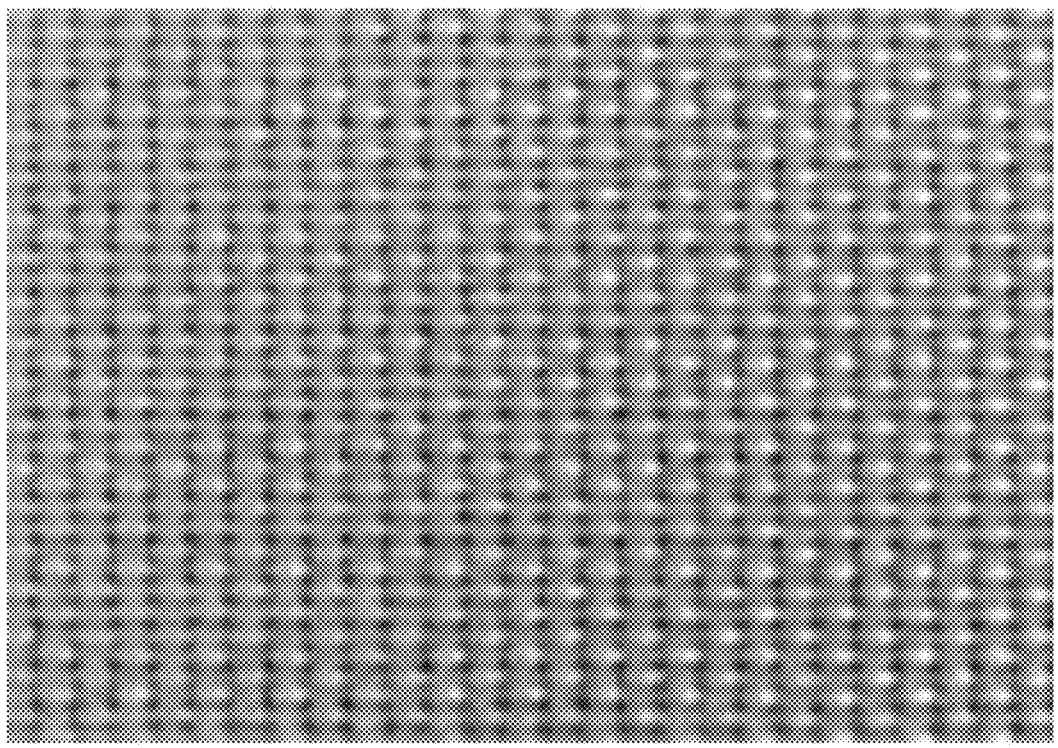
FIGS. 8A and 8B show enlarged top views of a base layer of a wallpaper in the form of woven polyester fabric according to yet further preferred embodiments of the invention.
Figure 8B:
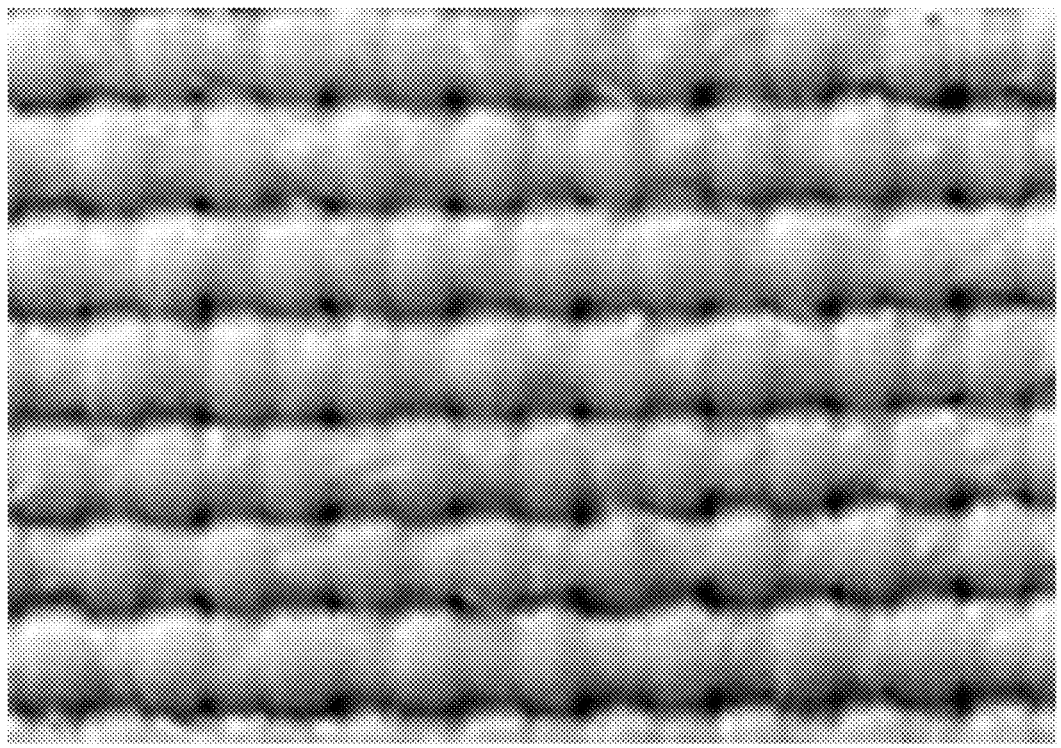
Figure 9A:
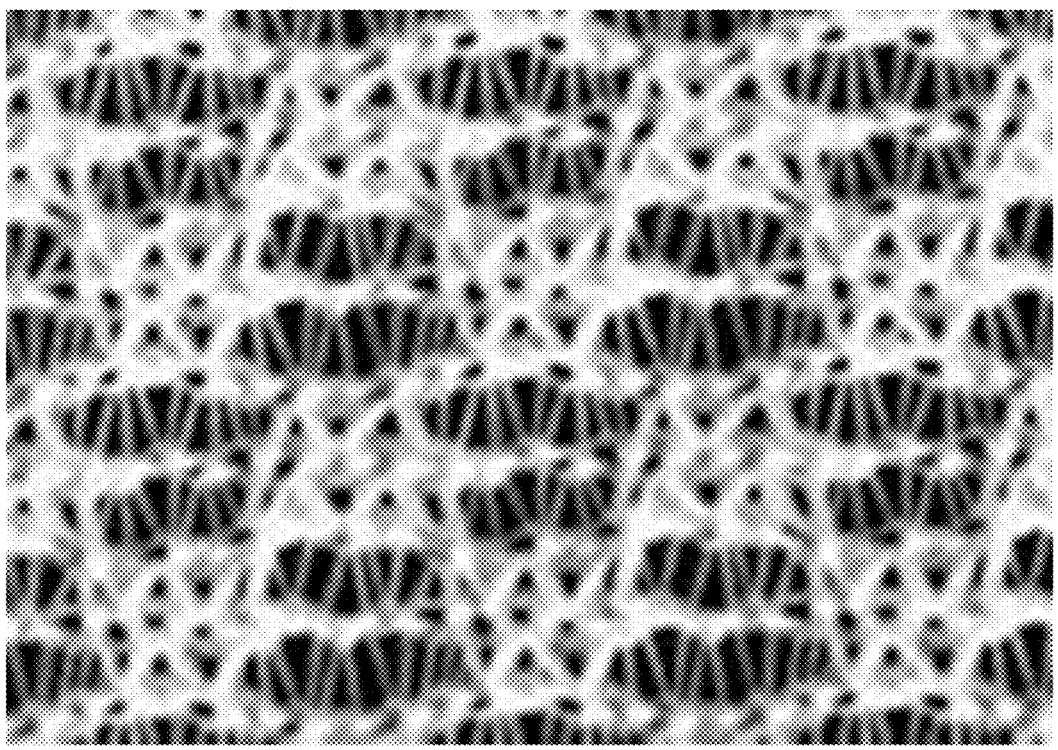
FIGS. 9A to 9C show enlarged top views of a base layer of a wallpaper in the form of knitted polyester fabric according to yet further preferred embodiments of the invention.
Figure 9B:
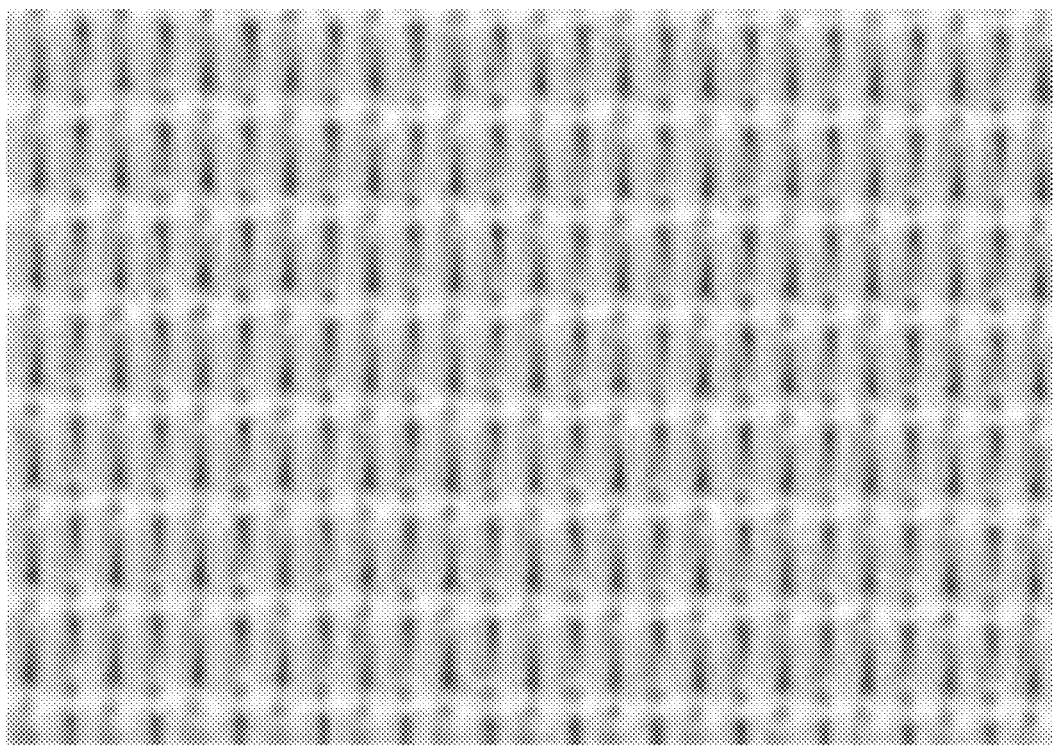
Figure 9C:
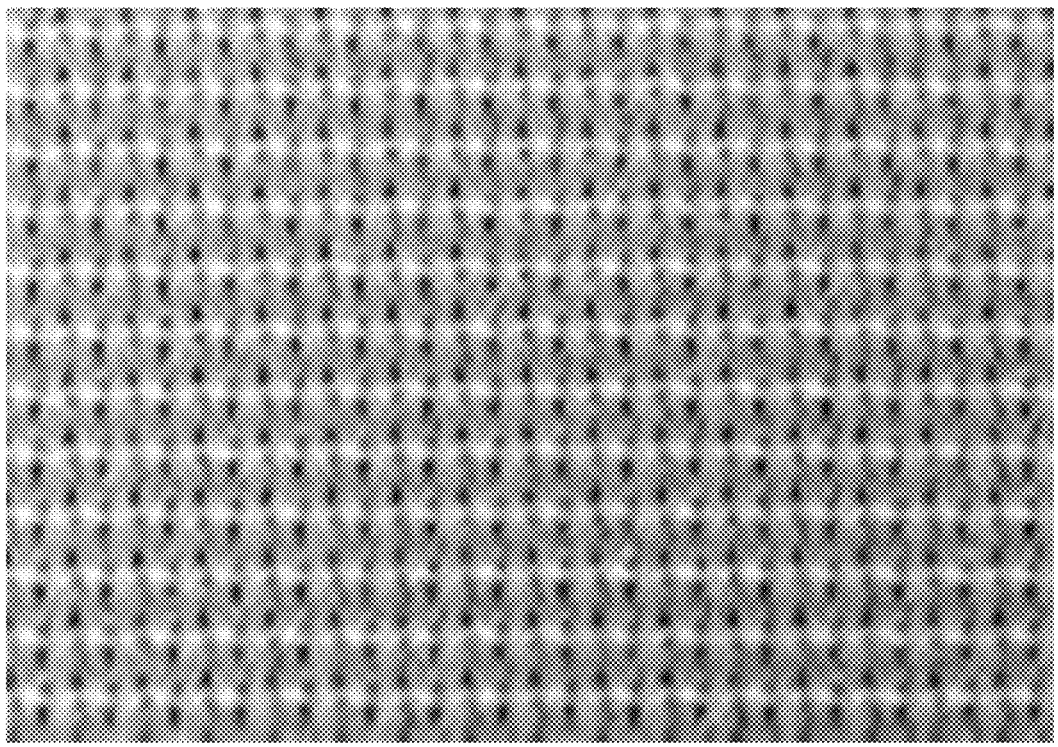

FIGS. 7A to 7C illustrate enlarged top views of a base layer of a wallpaper in the form of a warp-knitted polyester fabric according to further preferred embodiments of the invention. In each case, at the top of the picture, a centimeter scale subdivided into ten millimeter spaces is shown. FIGS. 8A and 8B show enlarged top views of a base layer of a wallpaper in the form of warp-knitted polyester fabric according to yet further preferred embodiments of the invention. And FIGS. 9A to 9C illustrate enlarged top views of a base layer of a wallpaper in the form of warp-knitted polyester fabric according to yet further preferred embodiments of the invention.

In the following, a comparative test series is disclosed for the further preferred embodiments of the invention shown in FIGS. 7A to 9C:

1. Test Rig

A total of 12 different flat fabric samples were mounted or wallpapered as a base layer or, resp., a textile fabric. These fabric samples were dismounted and, resp., removed from the wall again after drying and, resp., setting of the wallpaper glue.

The fabric samples were initially cut to a uniform size of a 50 cm×50 cm square cut. Then these fabric samples were flatly glued onto a conventional gypsum board evenly covered with a wallpaper glue for simulating a standard wall surface. Uniform application was ensured by flatly removing an excess of the wallpaper glue by means of a rubber lip stripper.

As wallpaper glue, in this case a conventional liquid wallpaper glue was used (produced by Henkel KGaA, type designation "Metylan Spezialkleister"). The liquid formulation ensures, in accordance with better experimental reproducibility, that the wallpaper glue is used being already formulated to be stabilized as regards its viscosity. Thus, the influence of an otherwise time-variable viscosity build-up of the wallpaper glue, in particular on the flow behavior as well as the dynamic and/or static wetting angle, is most largely eliminated. Also, in the wallpaper glue used here the otherwise relatively short processing window is increased by means of the specific formulation, and possible effects of wrong mixing or stirring of the wallpaper glue by the user are disregarded, which is equally selected in accordance with an optimized reproducibility of the test series disclosed here. Comparative tests with a conventional wallpaper glue (dry filling for mixing by the customer) showed comparable results, however, so that the invention is by no means limited to the use of a liquid wallpaper glue.

After drying and, resp., setting of the wallpaper glue, the maximum stripping forces required for dismounting or removing the fabric samples from the wall was measured in Newton by means of a linear tension measuring instrument. To this end, removal was carried out along the gypsum board as wall surface, viz. at an angle of virtually 0°, i.e., the direction of tension being parallel to the wall surface. The respective fabric sample was stripped from a first corner (e.g., top left) to a diametrically opposed second corner (e.g., bottom right) flatly (onto itself) so that the stripping force was exerted at an angle of (about) 45° with an upper edge or lateral edge of the fabric sample.

In the comparative test series, the following fabric samples were used:

a) Apparel fabrics (not shown in Figures)
100% viscose, woven fabric
100% polyester, woven fabric
100% linen, woven fabric
100% cotton, woven fabric b) Fabrics for flags by Georg+Otto Friedrich GmbH (64846 Gross-Zimmern, Germany)
6043 KFL, knitted fabric
6144 GS, knitted fabric
7137 KGFS, knitted fabric c) Fabrics for flags by Gebrüder Aurich GmbH (42477 Radevormwald, Germany)
No. 637, woven fabric
No. 624, woven fabric
No. 386, knitted fabric
No. 254, knitted fabric
No. 261, knitted fabric

2. Test Results a) Apparel fabrics
100% polyester (not shown in Figures)
mounting
   deformation when applied to adhesive surface;
   non-uniform penetration of the fabric by the glue;
   fraying at the edges;
dismounting
   dimensional stability during drying;
   removable as a whole without residues, maximum stripping force 12 N;
   fraying at the edges.
100% viscose (not shown in Figures)
mounting
   deformation when applied to adhesive surface;
   non-uniform penetration of the fabric by the glue;
   fraying at the edges;
dismounting
   dimensional stability during drying;
   not non-destructively removable, maximum stripping force 90 N;
   fraying at the edges.
100% linen (not shown in Figures)
mounting
   deformation when applied to adhesive surface;
   non-uniform penetration of the fabric by the glue;
   fraying at the edges;
dismounting
   dimensional stability during drying;
   removable as a whole without residues, maximum stripping force 41 N;
   fraying at the edges.
100% cotton (not shown in Figures)
mounting
   deformation when applied to adhesive surface;
   non-uniform penetration of the fabric by the glue;
   fraying at the edges;
dismounting
   dimensional stability during drying;
   removable as a whole without residues, maximum stripping force 17 N;
   fraying at the edges.

b) Fabrics for flags by Georg+Otto Friedrich GmbH (64846 Gross-Zimmern, Germany)
No. 6043 KFL, knitted fabric
(enlarged top view in FIG. 7a)
flame-retardant finishing;
standard fabric for flags; excellent printability;
extra thermal fixing and conditioning for digital print;
weight 110 g/m$^2$;
mounting
   attachable to the glue without deformation;
   very uniform penetration of the fabric by the glue;
   no fraying at the edges;
dismounting
   dimensional stability during drying;
   removable as a whole without residues, maximum stripping force 57 N;
   no fraying at the edges.
No. 6144 GS, knitted fabric
(enlarged top view in FIG. 7b)
flame-retardant;
machine-washable at 40° C.; professional dry-cleaning;
transfer print and/or direct print with sublimation inks;
weight 110 g/m$^2$;
mounting
   attachable to the glue without deformation;
   very uniform penetration of the fabric by the glue;
   no fraying at the edges;
dismounting
   dimensional stability during drying;
   removable as a whole without residues, maximum stripping force 62 N;
   no fraying at the edges.
No. 7137 KGFS, knitted fabric
(enlarged top view in FIG. 7c)
flame-retardant;
transfer print and/or direct print with sublimation inks and/or with UV hardening inks and/or with latex inks;
weight 120 g/m$^2$;
mounting
   attachable to the glue without deformation;
   very uniform penetration of the fabric by the glue;
   no fraying at the edges;
dismounting
   dimensional stability during drying;
   removable as a whole without residues, maximum stripping force 38 N;
   no fraying at the edges.

c) Fabrics for flags by Gebrüder Aurich GmbH (42477 Radevormwald, Germany)
No. 637, woven fabric
(enlarged top view in FIG. 8a)
light taffeta-type woven for interior decoration;

application: indoor, exhibitions, decoration;
weight 68 g/m$^2$;
sublimation direct print;
mounting
  deformation when applied to adhesive surface;
  non-uniform penetration of the fabric by the glue;
  fraying at the edges;
dismounting
  dimensional stability during drying;
  removable as a whole without residues, maximum stripping force 35 N;
  fraying at the edges.
No. 624, woven fabric
(enlarged top view in FIG. 8b)
woven flag fabric free from stress whitening,
longer durability, very resistant, strong print through, edge sharpness;
application: extremely durable flags, indoor and outdoor;
weight 155 g/m$^2$;
sublimation direct print;
mounting
  deformation when applied to adhesive surface;
  non-uniform penetration of the fabric by the glue;
  fraying at the edges;
dismounting
  dimensional stability during drying;
  removable as a whole without residues, maximum stripping force 32 N;
  fraying at the edges.
No. 386, knitted fabric
(enlarged top view in FIG. 9a)
warp-knitted flag for high wind forces with indicated hole structure, 3-yarn system;
weight 115 g/m$^2$;
screen printing and/or transfer print and/or sublimation direct print;
mounting
  attachable to the glue without deformation;
  very uniform penetration of the fabric by the glue;
  no fraying at the edges;
dismounting
  dimensional stability during drying;
  removable as a whole without residues, maximum stripping force 38 N;
  no fraying at the edges.
No. 254, knitted fabric
(enlarged top view in FIG. 9b)
warp-knitted flag for extremely high printing resolution, 2-yarn system;
weight 115 g/m$^2$;
screen printing and/or transfer print and/or sublimation direct print;
mounting
  applicable to the glue without deformation;
  very uniform penetration of the fabric by the glue;
  no fraying at the edges;
dismounting
  dimensional stability during drying;
  removable as a whole without residues, maximum stripping force 66 N;
  no fraying at the edges.
No. 261, knitted fabric
(enlarged top view in FIG. 9c)
warp-knitted flag for high printing resolution;
dense structure by textured use of yarn; 2-yarn system;
weight 115 g/m$^2$;
screen printing and/or transfer print and/or sublimation direct print;
mounting
  attachable to the glue without deformation;
  very uniform penetration of the fabric by the glue;
  no fraying at the edges;
dismounting
  dimensional stability during drying;
  removable as a whole without residues, maximum stripping force 25 N;
  no fraying at the edges.

The invention claimed is:

1. A wallpaper which can be detachably applied to a wall or ceiling surface with wallpaper paste, the wallpaper consisting of a single sheet-like base layer of a textile with no adhesive,
the base layer comprising a rear side for attachment to the wall or ceiling surface and a front side opposite the rear side,
wherein the base layer comprises a plurality of holes, each of the plurality of holes having a perforated structure that extends from the rear side to the front side, such that the base layer allows liquid adhesive applied to the front side to transfer to the rear side and spread onto the wall or ceiling surface, and such that liquid adhesive on the wall or ceiling surface dries through the plurality of holes into ambient air.

2. The wallpaper according to claim 1, wherein the base layer is in the form of mesh fabric.

3. The wallpaper according to claim 2, wherein the mesh fabric is configured:
  with a treble stitch; and/or
  in a single-yarn system, 2-yarn system or 3-yarn system; and/or
  as a warp-knitted fabric; and/or
  as a stitch-bonded fabric.

4. The wallpaper according to claim 1, wherein the base layer is a non-woven.

5. The wallpaper according to claim 1, wherein the base layer is a woven fabric.

6. The wallpaper according to claim 1, wherein the base layer is made from at least 50% of a synthetic polymer comprising polyamide and/or polyacrylic and/or polypropylene and/or polyester.

7. The wallpaper according to claim 1, wherein the base layer has a weight per unit area of less than 200 g/m$^2$.

8. The wallpaper according to claim 1, wherein the base layer is dimensionally stable in a state of the wallpaper wetted by the wallpaper paste present in a liquid and, resp., non-set state.

9. The wallpaper according to claim 1, wherein the base layer is non-swelling as regards water and/or as regards the wallpaper paste present in the liquid and, resp., non-set state.

10. The wallpaper according to claim 1, wherein the base layer has a longitudinally definable first elongation value at 100 N and/or a transversely definable elongation value at 100 N which is less than or equal to 25%.

11. The wallpaper according to claim 1, wherein the base layer and/or a textile yarn thread of the base layer and/or a single textile filament of the base layer has/have a tensile and/or tear strength of more than 800 MPa.

12. The wallpaper according to claim 1, wherein the base layer in a dried and, resp., set state of the wallpaper paste of the wallpaper attached to the wall or ceiling surface can be removed from the wall or ceiling surface almost or completely residue-free.

13. The wallpaper according to claim 1, wherein the base layer has an internal void volume portion ranging from 20% to 60% or has a surface tension ranging from 18 to 55 mN/m.

14. The wallpaper according to claim 1, wherein:
- a first wettability by water and/or by a hydrophilic solvent of the wallpaper paste onto the wall or ceiling surface is better than onto the base layer; and
- a second wettability by a disperse portion of the wallpaper paste onto the base layer is better than onto the wall or ceiling surface; and/or
- the first and/or second wettability is/are configured so that a height of a paste gap of the wallpaper paste forming in the liquid and, resp., non-set state between the base layer and the wall or ceiling surface is less than or equal to 100 nm.

15. The wallpaper according to claim 1, wherein the base layer is configured to be permeable to air in a dried and, resp., set state of the wallpaper paste applied to the base layer.

16. The wallpaper according to claim 1, wherein at least 50% of the base layer are made from a biodegradable material and/or compound.

17. The wallpaper according to claim 1, wherein each of the plurality of holes has an area of 0.2 to 2.0 mm$^2$.

18. The wallpaper according to claim 17, wherein each of the plurality of holes has an area of 0.3 to 0.8 mm$^2$.

19. The wallpaper according to claim 1, wherein the textile is a synthetic fiber.

20. The wallpaper according to claim 1, wherein the passages comprise capillary liquid passages.

* * * * *